US007301569B2

United States Patent
Kinjo et al.

(10) Patent No.: US 7,301,569 B2
(45) Date of Patent: Nov. 27, 2007

(54) IMAGE IDENTIFYING APPARATUS AND METHOD, ORDER PROCESSING APPARATUS, AND PHOTOGRAPHING SYSTEM AND METHOD

(75) Inventors: Naoto Kinjo, Kanagawa (JP); Hiroaki Nakamura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 811 days.

(21) Appl. No.: 10/254,580

(22) Filed: Sep. 26, 2002

(65) Prior Publication Data

US 2003/0103149 A1    Jun. 5, 2003

(30) Foreign Application Priority Data

Sep. 28, 2001   (JP)   ............................. 2001-303527
Mar. 28, 2002   (JP)   ............................. 2002-91983

(51) Int. Cl.
H04N 5/76      (2006.01)
H04N 5/225     (2006.01)
H04N 5/232     (2006.01)

(52) U.S. Cl. ................................ 348/231.5; 348/207.99
(58) Field of Classification Search ............. 348/231.1, 348/116, 552, 231.5; 455/456.1; 386/46, 386/69; 703/310
See application file for complete search history.

(56) References Cited

U.S. PATENT DOCUMENTS 5,296,884 A * 3/1994 Honda et al. ............... 396/311

6,396,537 B1 * 5/2002 Squilla et al. .............. 348/239
6,813,395 B1 * 11/2004 Kinjo ......................... 385/305
6,833,861 B2 * 12/2004 Matsumoto et al. ...... 348/207.2
6,914,626 B2 * 7/2005 Squibbs .................... 348/231.3
6,928,230 B2 * 8/2005 Squibbs ....................... 386/46
2004/0201676 A1 * 10/2004 Needham ................. 348/207.1

FOREIGN PATENT DOCUMENTS

| JP | 5-328189 | 12/1993 |
| JP | 6-233307 | 8/1994 |
| JP | 6-268894 | 9/1994 |
| JP | 9-322048 | 12/1997 |

* cited by examiner

Primary Examiner—David Ometz
Assistant Examiner—Luong T. Nguyen
(74) Attorney, Agent, or Firm—Sughrue Mion Pllc.

(57) ABSTRACT

In a sightseeing location, theme park or the like, a cameraman takes a picture with any customer as a subject. Photographic image data is stored, together with a photographing date/time and location, to an HDD of an order processing apparatus. A position information service center periodically transmits a position of a cellular phone carried by each customer to the order processing apparatus. The transmitted information, together with a date/time, is stored in the HDD as each customer's movement history. In case an image order is requested by a customer through an order receiving terminal or the like, the order processing apparatus collates a movement history of the corresponding customer with each photographing date/time and location of the photographic image data, and extracts only images having that customer as a subject to be list-displayed on a display.

19 Claims, 19 Drawing Sheets

FIG.11A

TAG SENSOR POSITION TABLE T1

| SENSOR IDENTIFYING INFORMATION | LONGITUDE INFORMATION | LATITUDE INFORMATION | ALTITUDE INFORMATION |
|---|---|---|---|
| 0001 | X1 | Y1 | Z1 |
| 0002 | X2 | Y2 | Z2 |
| ... | ... | ... | ... |

FIG.11B

POSSESSOR IDENTIFYING TABLE T2

| TAG IDENTIFYING INFORMATION | POSSESSOR INFORMATION |
|---|---|
| 1001 | H1 |
| 1002 | H2 |
| ... | ... |
| 2001 | K1 |
| 2002 | K2 |
| ... | ... |

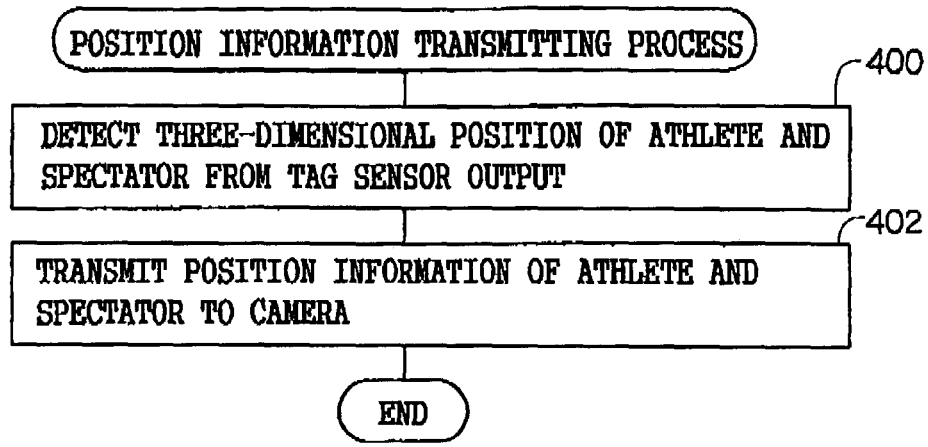
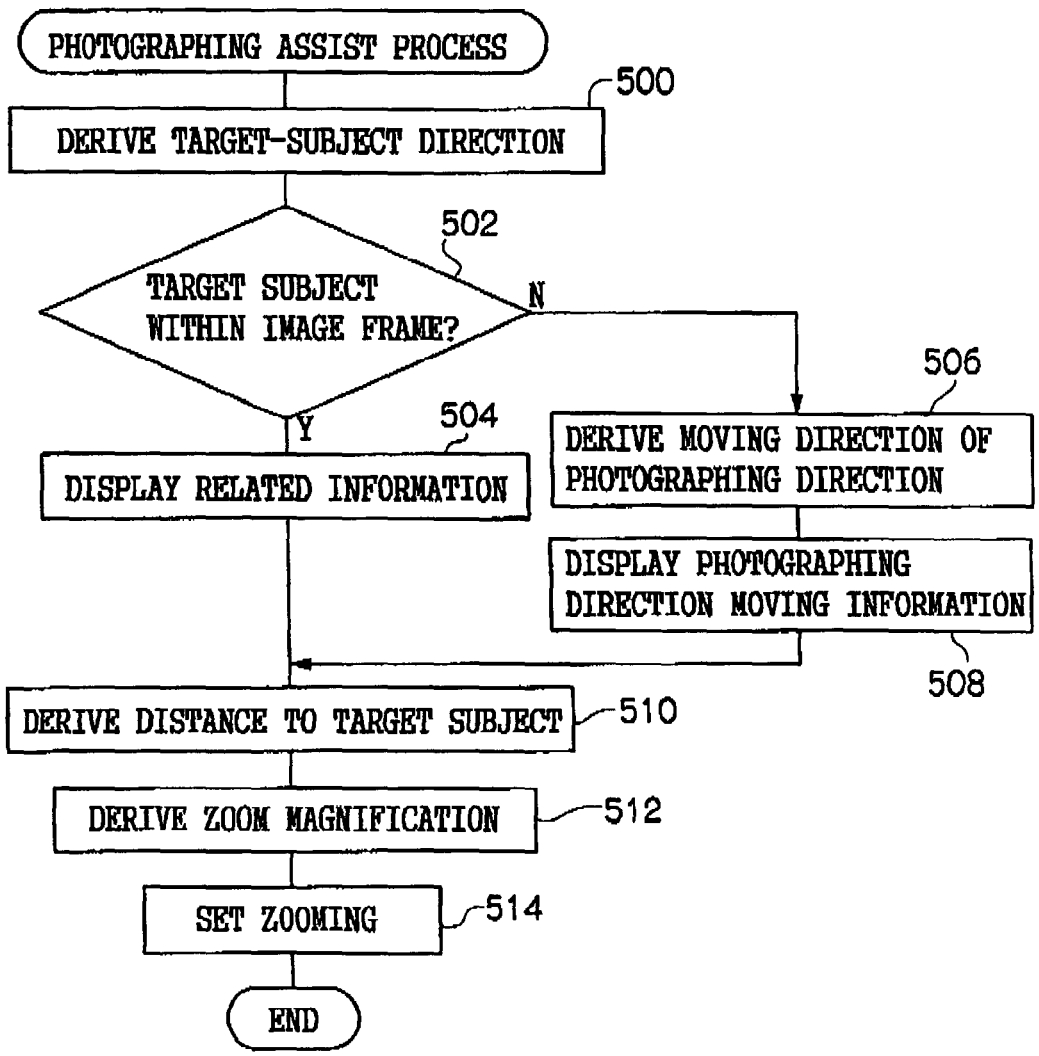

IMAGE IDENTIFYING APPARATUS AND METHOD, ORDER PROCESSING APPARATUS, AND PHOTOGRAPHING SYSTEM AND METHOD

BACKGROUND OF THE INVENTION

1. Field of the Invention

This invention relates to an image identifying apparatus, order processing apparatus and image identifying method. More particularly, the invention is concerned with an image identifying apparatus that identifies a person as a subject in an image or image of a particular person as a subject, an order processing apparatus that processes a customer's order for an image identified by the image identifying apparatus, and an image identifying method applicable for the image identifying apparatus.

Also, the invention relates to a photographing system and method, and more particularly to a photographing system and method for assisting to take a picture by a photographing apparatus.

2. Description of the Related Art

In the case of outing to a sightseeing resort, theme park or the like while carrying a photographing apparatus such as a camera in order to take a commemoration picture at the major spot, a tripod if carried together with a camera will pose a troublesomeness in setting thereof. For this reason, there is a tendency to decrease the pictures having a photographing person as a subject. Meanwhile, when taking a shot of a scene of enjoyment amid a particular attraction in the theme park for example, only the attendants as subjects can participate in the attraction while the person who is taking pictures is obliged to devote himself or herself to taking pictures without taking part in the attraction. In this manner, it is often a case to encounter a great deal of difficulty.

As one approach to eliminate the disadvantage, it is a conventional practice to automatically take shots of participants, for example, in a particular attraction of the theme park so that the participant is allowed to look the shot image at the exit of the particular attraction. Upon an order from the participant, a photoprint is made and delivered to the participant (customer). Meanwhile, it is also a practice that a cameraman, at a sightseeing resort or the like, takes a picture of an unspecified visitor. A photoprint of a shot image is presented at or around an exit of the resort spot, allowing the visitor (customer) as a subject to purchase it.

When taking a picture of a moving subject, such as an athlete in various kinds of sports and an animal, by a photographing apparatus of a digital still camera, digital video camera or the like, conventionally the photographing person himself/herself moves the photographing direction of the photographing apparatus in accordance with a movement of the subject. However, where a subject is located comparatively far or when taking a picture of a one athlete singled out of a multiplicity of athletes, it is often the case that a subject as a photographing target is lost sight of. Thus, there is difficulty in taking a picture of such a subject.

In order to eliminate such a problem, conventionally there are an art that a moving direction of a moving subject is detected to automatically move (automatically track) the photographing direction of the photographing apparatus toward the moving direction (JP-A No.5-328189, JP-A No.6-233307), an art that an objective subject is detected from a wide-angle photographing scene to carry out automatic tracking in order to take a moving picture in the later (JP-A No.6-268894 and JP-A No.9-322048) and so on.

In the above techniques, however, there is a need for the customer himself or herself to find an image the customer is taken as a subject from among a plurality of images presented. Consequently, there is a drawback that the burden on the customer increases in finding a desired image with increase in the number of presented images. This possibly leads to a customer's declined desire against purchase.

In the foregoing art of automatic tracking, however, it is not necessarily possible to detect a moving direction of a target subject or correctly detect it from a photographing scene. There is a problem that, when detection is incorrect, a subject cannot be taken a picture of at all.

SUMMARY OF THE INVENTION

The present invention has been made by taking into account the foregoing fact. It is a first object of the invention to obtain an image identifying apparatus and image identifying method that can easily identify a person as a subject in an image or image having a particular person as a subject.

A second object of the invention is to obtain an order processing apparatus by which a customer can easily place an order of an image having a particular person as a subject.

A third object of the invention is to provide a photographing system and method that, when taking a picture of a moving subject, can easily and assuredly take a picture of the subject.

In order to achieve the first object, an image identifying apparatus according to a first aspect of a first invention comprises: an acquiring component which acquires a photographing date/time and photographing location at the time of taking a picture with an unspecified person as a subject; an image data storage device which stores image data acquired by the photographing; and an identifying device which identifies, by collating a movement history of a person photographed as a subject with the photographing date/time and the photographing location, which correspond to said stored image data, at least one of a person who is the subject of the image expressed by the image data, and image data of an image for which a particular person is the subject.

In the first aspect, a photographing date/time and location, in taking a picture of an unspecified person as a subject, is acquired by the acquiring component to store the image data obtained by the photographing to the image data storage device. Incidentally, photographing date/time and location can be detected, specifically, by providing a date/time detecting component which detects a current date/time and a position detecting component which detects a current position (e.g. component for detecting a current position by utilizing a GPS system) in a photographing apparatus for use in taking pictures (e.g. camera, digital still camera or digital video camera) as in a second aspect. Also, a photographing date/time and location may be acquired, for example, on-line from the photographing apparatus through radio communication, or off-line (e.g. by reading a date/time and location once stored in a recording medium).

In the meanwhile, on an image having a person as a subject, a person as a subject in the image can be identified by determining a person happened to be present in the photographing location upon taking that image. Also, identification of an image having a specified person as a subject is possible by determining whether or not the particular person has been present in the photographing location. The above determination (identification) can be realized by collating a photographing date/time and location of an image with a movement history of a person as a subject without acquiring the information specifying a person as a subject upon taking a picture.

Based upon the above, the identifying device of the first aspect collates a photographing date/time and location corresponding to image data stored in the data storage device with a movement history of a person taken a picture of as a subject, thereby identifying a person as a subject in an image represented by the image data stored in the image data storage device or image data of an image having a particular person as a subject. Incidentally, movement history of a person may be, for example, information chronologically representing, with nearly a constant period, the positions (places) and date/times that the same person has existed in the past, or information representing the position (place) and date/time that the same person has existed temporarily in the past (e.g. having been in "a position-y at about x (hour), ○ (month) X (day)").

In this manner, the first aspect collates a photographing date/time and location with a movement history of a person thereby identifying a person as a subject in an image or image data of an image having a particular person as a subject. Accordingly, there is no need for a person as a subject to carry a special apparatus having a function to transmit person-identifying information. It is possible to easily identify a person as a subject in an image or an image having a particular person as a subject.

Incidentally, in the first aspect, movement history of a person can be kept, for example, on a side of the person as a subject. Specifically, the movement history of a person may be automatically recorded onto a recording medium carried by the person or the person himself may simply store a movement history. In the case that the movement history of a person is kept on the person side as in the above, it is possible to structure the identifying device, for example as in a third aspect, such that a plurality of image data is stored in the image data storage device, and the identifying device collates the movement history of the particular person inputted through an input device with each of the plurality of photographing date/times and locations corresponding to any of the plurality of image data stored in the data storage device, to identify the image data of the image having the particular person as the subject.

Incidentally, in the aspect to automatically record a movement history of a person onto a recording medium, the input device can be configured by a reading device or the like to read information out of the recording medium. Also, in the aspect the person himself or herself memorizes a movement history, the input device can be configured by a keyboard or the like for the person himself or herself to input a movement history. In a third aspect, because the image identifying device of the invention is not required to have a function of gathering movement histories of individual persons, the image identifying device of the invention can be simplified in structure.

Meanwhile, in the first aspect, movement history of a person can be gathered/held, for example, on the side of the image identifying device of the invention. For example, as in a fourth aspect, it is possible to structure further comprising a gathering component which gathers movement histories of a plurality of persons, and a movement history storage device which stores the movement histories of the plurality of persons gathered by the gathering component, wherein the identifying device collates a photographing date/time and location corresponding to the image data with each of the movement histories of the plurality of persons stored in the movement history storage device, thereby identifying a person as a subject in an image represented by the image data.

In this case, the information concerning photographic image (image data, photographing date/time and location, etc.) and the movement histories of a plurality of persons are collectively controlled in the image identifying device of the invention. It is possible to consider an aspect to be externally given a predetermined instruction to use a result of identification by the identifying device (e.g. instruction to extract all the image data of an image having a particular person as a subject, or so). In this case, concerning the individual image whose image data is stored in the image data storage device, a photographing date/time and location can be collated with each of a plurality of movement histories of a plurality of persons so that the identification by the identifying device, e.g. identifying each of the persons as subjects in the individual images, can be made prior to being given that instruction. Accordingly, even where externally given a predetermined instruction utilizing a result of identification by the identifying device, response is possible to the external instruction in a brief time.

Meanwhile, in the fourth aspect, the movement histories of a plurality of persons can be gathered by gathering component, for example as in a fifth aspect, wherein the gathering component gathers each of the movement histories of the plurality of persons by: periodically receiving the current position of the individual person; corresponding said received current position of the individual person with the current date/time and information for identifying said individual person; and making the movement history storage device store said corresponded information.

Meanwhile, in the fifth aspect, the current position of an individual person is to be detected by a communication between a portable communication apparatus (e.g. PDA, or cellular phone) carried by the individual person and base stations provided substantially at a constant interval, for example as in a sixth aspect. Incidentally, in the case the portable communication apparatus is a cellular phone, the current position of an individual person can be periodically transmitted by making use of a position information service to be provided by a cellular-phone company (service to transmit a current position of a cellular-phone owner).

Meanwhile, the current position of an individual person is to be detected by a position detecting device provided in a portable communication apparatus carried by the individual person (e.g. an apparatus for detecting a current position by utilizing a GPS system), for example as in a seventh aspect. Incidentally, as noted before, even in the aspect to automatically record a movement history of a person onto a recording medium carried by the person, the sixth or seventh aspect can be applied to sequentially record periodically-detected person's current positions onto the recording medium thereby recording persons' movement histories.

Meanwhile, in the first aspect, the acquiring component preferably acquires at least one of a photographing azimuth and magnification upon talking a picture of an unspecified person as a subject, and the identifying device uses at least one of the photographing azimuth and magnification acquired by the acquiring component to identify a person as a subject in an image represented by the image data stored in the image data storage device or image data of an image having a particular person as a subject, for example as in an eighth aspect.

Particularly, in taking a picture with a high photographing magnification, photographing scope is narrowed. Accordingly, even where a particular person is revealed to happen to be present in a photographing location as a result of collation of a photographing date/time and location on a particular image with a movement history of a particular person, a case might occur that the particular person actually is not a subject in the particular image. In contrast to this, in the invention set forth in claim 8, accuracy of identifying person or image can be improved because at least one of a photographing azimuth and a photographing magnification is used to identify a person as a subject or an image having a particular person as a subject.

Meanwhile, in order to achieve the second object, the order processing apparatus of a second invention comprises: an image identifying device according to the first invention; a display control component which causes a display device to display an image having a designated person as a subject depending upon a result of identification by the identifying device; and a processing component which carries out a predetermined process according to an order from a customer as a subject for the images displayed on the display device.

The order processing apparatus of this invention, having an image identifying device of the first invention, can easily identify a person as a subject in an image or an image having a particular person as a subject, similarly to the first invention. In the second invention, based on a result of the identification by the identifying device, the display control component causes the display device to display, on a display device, the image having the designated person as the subject while the processing component carries out a predetermined process according to an order from a customer for the image displayed on the display device. Accordingly, it is possible to cope with an order placed by the customer for the image displayed on the display device.

In this manner, according to the second invention, it is easy to place an order for the image having the particular person as the subject, because, in case a customer designates a person as a subject of order, the image having the designated person as the subject is displayed on the display device and placing an order is made possible for the image displayed.

Meanwhile, in order to achieve the second object, an order processing apparatus according to a third invention comprises: an image identifying device according to the first invention; a distributing device which distributes an image having a certain person as a subject to a customer based on a result of identification by the identifying device; and a processing component which carries out a predetermined process according to an order from a customer for the distributed image.

The order processing apparatus according to a third invention, having an image identifying device of the first invention, can easily identify a person as a subject in an image or an image having a particular person as a subject, similarly to the first invention. In the third invention, depending upon a result of identification by the identifying device, the image having the certain person as the subject is distributed to a customer by the distributing device while the processing component carries out a predetermined process according to an order from a customer for the image distributed by the distributing device. Accordingly, it is possible to cope with an order placed by a customer whose image has been distributed.

Incidentally, the certain person may be a customer himself or herself or a person previously registered by a customer (e.g. a family member). Meanwhile, image distribution can be realized, for example, by sending an image onto a computer or portable apparatus possessed by a customer. In the third invention, an image having a certain person as a subject is automatically distributed to a customer so that the customer can place an order for the distributed image. Accordingly, it is easy for a customer to place an order for an image having a particular person as a subject.

Incidentally, the predetermined process in the second or third invention includes, for example, a process to make or request to make a photoprint by the use of the image data of an image designated by a customer among the image data stored in the image data storage device, and a process to deliver or distribute the image data of that designated image to a customer. Incidentally, a predetermined image process (e.g. enlargement/reduction, trimming or image process for improving image quality) may be made upon delivering or distributing the image data to the customer.

Meanwhile, in order to achieve the first object, an image identifying method according to a fourth invention comprises the steps of: acquiring a photographing date/time and photographing location at the time of taking a picture with an unspecified person as a subject; storing image data obtained by the photographing in an image data storage device; and collating the photographing date/time and location corresponding to the image data with a movement history of a person who was taken a picture of as a subject, thereby identifying a person as the subject in an image represented by the image data or image data of an image having a particular person as a subject.

It is accordingly possible to easily identify an image having a person as a subject in the image or particular person as a subject similarly to the first invention.

In order to achieve the object, a photographing system according to a fifth invention comprises: a position signal transmitting apparatus having transmitting means to send a radio signal representing a position of a target subject as a target of photographing; and a photographing apparatus having display means for displaying in real-time an image obtained by photographing, adjusting means for adjusting a magnification in photographing, detecting means for detecting a self-position, deriving means for deriving at least one of a photographing direction and a magnification to place the target subject within a photographing scope depending on the position of the target subject detected based on the radio signal and a self-position detected by the detecting means, and control means for controlling the display means to display direction information representative of a photographing direction when the photographing direction is derived by the deriving means and controlling the adjusting means to provide the magnification when the magnification is derived by the deriving means.

According to the present photographing system, the position signal transmitting apparatus sends, at transmitting means, a radio signal for representing a position of a target subject as a target in photographing. Incidentally, the radio signal includes, besides a radio signal containing information representative of a position (e.g. longitude information, latitude information, altitude (above sea level) information, etc.), a radio signal not containing information representative of a position. Herein, the information representative a position includes position information detected by utilizing GPS (Global Positioning Systems) and position information detected by utilizing a PHS (Personal Handy-phone System). Moreover, when the radio signal not containing information indicating a position is transmitted, the position can be specified by: receiving the radio signal with a plurality of antennas (or receivers), which are arranged in different positions, and applying the technique of triangulation to specify a transmission origin of the radio signal; or receiving the radio signal with some of a plurality of antennas (or receivers), positions at which the antennas are disposed are already known, and specifying the transmission origin of the radio signal from the disposed position of an antenna (or receiver), which received the radio signal with the highest intensity.

Furthermore, the radio signal includes a light of infrared ray or the like, besides a radio wave.

On the other hand, the the detecting means detects a self-position. By the deriving means, derived is at least one of a photographing direction and a magnification for placing the target subject within a photographing scope depending on a position of the target subject detected based on the radio signal and a self-position detected by the detecting means, i.e. a position of the photographing means. Furthermore, in the case the photographing direction is derived by the deriving means, the control means controls the display means, for displaying in real-time an image obtained by photographing, to display direction information representative of the photographing direction. In the case that the magnification is derived by the deriving means, the control means controls the adjusting means, for adjusting a magnification in photographing, to provide the magnification. Incidentally, the display means can apply every display, such as a liquid-crystal display, a plasma display, an organic EL display or a brawn tube display. Also, the photographing apparatus can include a digital camera, such as a digital video camera or a digital electronic still camera.

Namely, in the invention, in the case of deriving the photographing direction, the direction information representative of a photographing direction is displayed on the display means to clearly show the photographing person a photographing direction for placing the target subject within the photographing scope. Due to this, the photographing person is allowed to place the target subject within the photographing scope by merely moving the photographing direction of the photographing apparatus to a direction shown by the displayed direction information. Also, in the invention, in the case of deriving the magnification, the target subject can be placed within the photographing scope by controlling to provide the derived magnification. As a result of this, the entire image of target subject can be displayed in a display region of the display means, facilitating to confirm an existence of a target subject.

Also, in the invention, a cameraman captures a target subject while making reference to an image being displayed in real-time on the display means. Consequently, even when a target subject position detected on the basis of a radio signal in the invention is incorrect, it is easy for the photographing person to determine an occurrence of incorrectness. As a result of this, it is possible to prevent to improperly taking a picture of a target subject.

In this manner, according to the photographing system of the invention, the position signal transmitting apparatus transmits a radio signal to represent a position of a target subject as a target of photographing. The photographing apparatus derives at least one of a photographing direction or a magnification for placing the target subject within a photographing scope depending on a position of the target subject detected based on the radio signal and a self-position. In the case of deriving a photographing direction, the direction information representative of a photographing direction is displayed by the display means. In the case of deriving a magnification, the magnification for photographing is adjusted to that magnification. Accordingly, the photographing person is allowed to easily capture the target subject. As a result of this, when taking a picture of a moving subject, the subject can be easily, positively taken a picture of.

Incidentally, in the invention, at least one of the detecting means and the deriving means can be provided on an apparatus different from the photographing apparatus. This reduces the process load on the photographing apparatus as compared to the case providing both of the detecting means and deriving means on the photographing apparatus.

According to this photographing system, the control means of the photographing apparatus controls the display means to display related information to a target subject when the target subject is displayed on the display means.

In this manner, according to the photographing system, the effect similar to the foregoing invention is enjoyed. Because the display means is controlled to display related information to the target subject when a target subject is being displayed on the display means, the photographing person is allowed to take a picture of the target subject while making reference to the information related to the target subject. Thus, improved is convenience for the photographing person.

Incidentally, it is preferred that the deriving means further derives a moving speed of the target subject depending upon a change amount per predetermined time in position of the target subject while the control means controls the display means to change a display state of the related information in accordance with the moving speed.

According to the invention, the deriving means further derives a moving speed of the target subject depending on a change amount per predetermined time in position of the target subject, the control means controlling the display means to change a display state of the related information according to the moving speed. Incidentally, the changing a display state of related information depending on a moving speed is exemplified by changing to reduce the number of characters displayed in the related information as moving speed increases, changing to increase the size of characters displayed in the related information as moving speed increases.

In this manner, the invention can enjoy the effect similar to that of the foregoing invention. Furthermore, a moving speed of the target subject is derived depending on a change amount per predetermined time in position of the target subject, while the display means is controlled to change a display state of the related information in accordance with the moving speed. Accordingly, the related information can be easily made reference to even where the target subject is at a high moving speed and there is less opportunity in making reference to the related information. Thus, further improved is convenience for the photographing person.

On the other hand, in order to achieve the foregoing object, a photographing method of a fifth invention comprises: transmitting, with a position signal transmitting apparatus, a radio signal for indicating a position of a target subject as a target of a photographing; deriving, with a photographing apparatus, at least one of a photographing direction and a magnification for placing the target subject within a photographing scope based on a position of the target subject detected based on the radio signal and a self-position displaying, when the photographing direction is derived, direction information representative of the photographing direction by display means and adjusting, when the magnification is derived, a magnification of the photographing to the derived magnification.

According to the photographing method of the invention, because operation is similar to that of the fourth invention.

Consequently, when taking a picture of a moving subject, the subject can easily, positively taken a picture of, similarly to the fourth invention.

BRIEF DESCRIPTION OF THE DRAWINGS

FIGS. 11A and 11B are typical views showing a storage content in a tag sensor position table T1 and possessor identifying table T2 according to an embodiment;

FIG. 14 is a flowchart showing a flow of process of a position information transmitting process program according to the third/fifth embodiment;

FIG. 15 is a flowchart showing a flow of process of a photographing assist process program according to the third embodiment;

DETAILED DESCRIPTION OF THE PREFERRED EMBODIMENTS

Embodiments of the present invention will now be described with reference to the drawings.

Incidentally, in the following, although discussed is the correspondence relationship between the components set forth in the claims and the devices employed in the embodiment, the above components are not limited to the above devices but other devices can be used as the components.

First Embodiment

Figure 1:
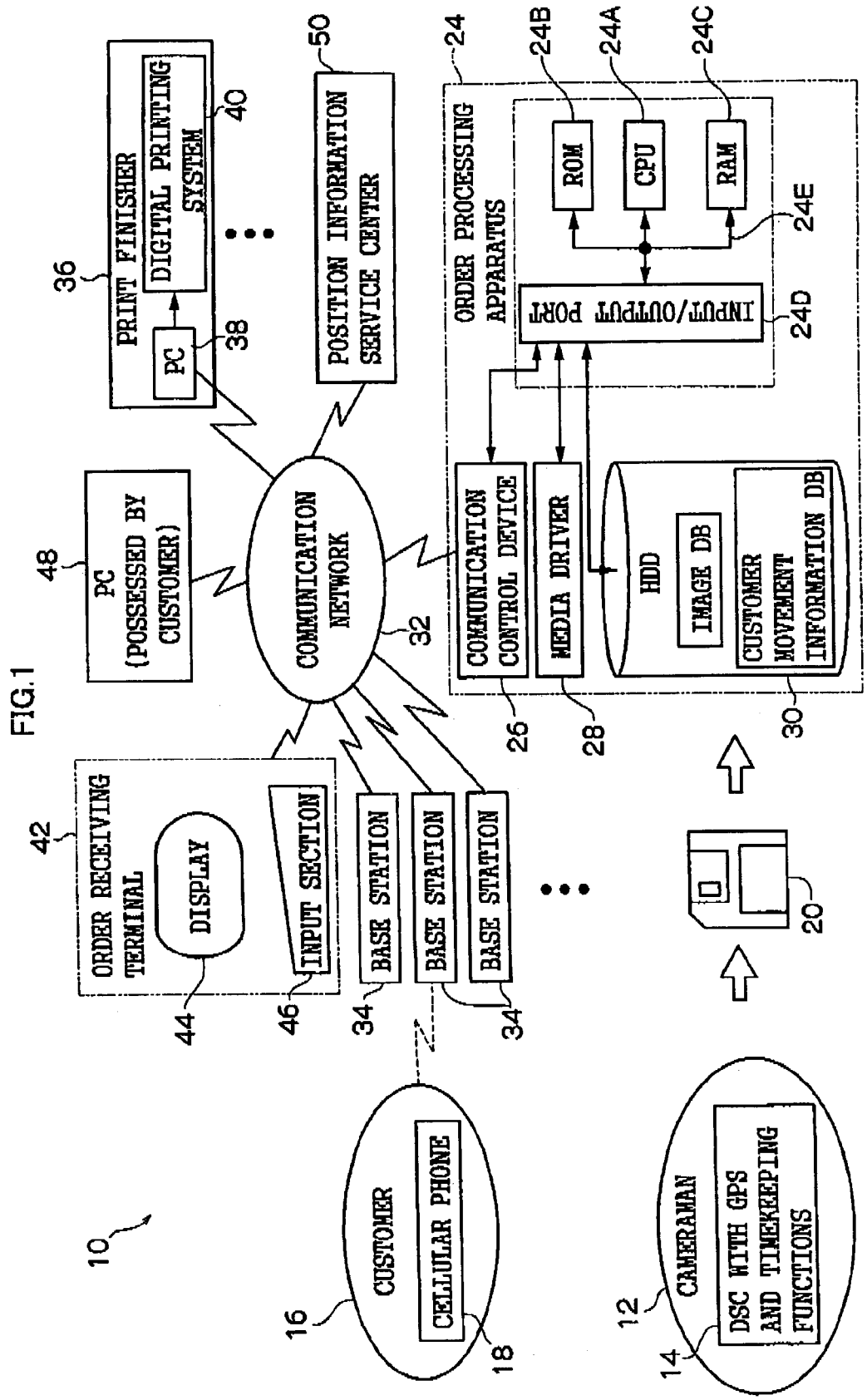
FIG. 1 is a schematic block diagram of an image order system according to a first embodiment.

There is shown, in FIG. 1, an image order system 10 according to a first embodiment. In the first embodiment, a cameraman 12 takes a picture of any person, as a subject, who happens to be present in a scene, e.g. at any photographing location such as a sightseeing resort, theme park, event hall or public garden. An image order system 10 of the first embodiment is a system which allows for the person (customer 16), taken a picture of as a subject in the shot, to place an order for a photographic image (specifically, place an order to make a photoprint or to deliver photographic image data).

Namely, the image order system 10 has an order processing apparatus 24 according to the invention. Note that the order processing apparatus 24 serves also as an image identifying apparatus of the invention. The order processing apparatus 24 is configured by a computer, such as a workstation, to have a CPU 24A, a ROM 24B, a RAM 24C and an input/output port 24D that are connected one with another through a bus 24E. To the input/output port 24D are connected a communication control device (e.g. modem or router) !26, a media driver 28 and a hard disk drive (HDD) 30.

The HDD 30 of the order processing apparatus 24 is previously installed with an image order program for the CPU 24A of the order processing apparatus 24 to execute an image order process (to be detailed later) according to the invention. Executing an image order program by the CPU 24A causes the computer constituting the order processing apparatus 24 to function as the order processing apparatus according to the invention.

Meanwhile, a cameraman 12, who will take a picture of an image for which an order is to be placed through the image order system 10, carries a digital still camera 14 (hereinafter, merely abbreviated as DSC 14) mounted with a GPS function to detect a current position by utilizing a GPS system and a timekeeping function to detect a current date/time. Pictures can be then by using the DSC 14. Each time the cameraman 12 takes a picture, photographic image data and other pieces of information are recorded by the DSC 14 onto a recording media 20 (e.g. SMART MEDIA™, COMPACT FLASH™ or MEMORY STICK™). The media driver 28 reads information of photographic image data and the like, out of the recording media 20 brought in by the cameraman 12.

Incidentally, the DSC 14 corresponds to a photographing component set forth in claim 3, the GPS function mounted on the DSC 14 to a position detecting component set forth in claim 3, and the timekeeping function to a date/time detecting component set forth in claim 3.

Meanwhile, the communication control device 26 of the order processing apparatus 24 is connected to a communication network 32. The communication network 32 includes not only a cellular phone network and a public telephone network but also a high-speed, high-capacity dedicated communication network or computer network, such as the Internet, and is connected with a multiplicity of base stations 34 configuring a part of the cellular phone network. The communication network 32 is also connected with a computer (PC) 38 possessed by each of print finishers 36 existing in multiplicity nationwide, a plurality of order receiving terminals 42, a computer (PC) 48 possessed by a customer 16 to the image order system 10, and a position information service center 50 of a cellular phone company.

The print finisher 36 possesses a digital print system 40 comprising apparatuses, such as a film scanner to read an image recoded on a photographic film and a digital printer for photoprinting to record an image represented by image data onto a recording material, such as a printing paper. The digital print system 40 is connected to a PC 38 so that it can carry out a photoprint process using the image data received by the PC 38 through the communication network 32.

Meanwhile, the order receiving terminal 42 is a terminal for receiving an order from a customer. The order receiving terminal 42 is set up at a desired position, which may be in the vicinity of a location where the cameraman 12 is taking pictures, or at a position having no relation to the photographing location (e.g. at a point-of-sale of a convenience store or photo shop). The order receiving terminal 42 is configured to include a display 44 comprising a CRT or LCD to display images, an input section 46 comprising a keyboard or the like for a customer to input a desired piece of information, and a function of communicating with the order processing apparatus 24 through the communication network 32.

Meanwhile, in the first embodiment, each of the customers to the image order system 10 (customer having been taken a picture by the cameraman 12) carries a cellular phone 18 and is subscribed to a position information service offered by the cellular phone company. The position information service is a service periodically provided for each customer that, by a communication between a cellular phone 18 (e.g. cellular phone of a PHS (Personal Handy-phone System) carried by the customer and a base station 34, the position information service center 50 locates a position of the cellular phone 18 (determines a base station 34 nearest to the cellular phone 18) to recognize a current position of the customer and transmit a recognized current position to a third person. In the first embodiment, a current position of each customer is to be periodically transmitted from the position information service center 50 to the order processing apparatus 24. In this manner, the cellular phone 18 corresponds to a portable communication apparatus set forth in claim 9.

Description is now made on the operation of the first embodiment. In the first embodiment, the cameraman 12 waits for a person as a subject to come while staying at a certain point of any photographing location as noted before or walking around a vicinity thereof. When a person comes, he or she uses the DSC 14 to repeats taking pictures of the person. Each time of taking a picture, the DSC 14 carried by the cameraman 12 detects a current position by the GPS function and a current date/time by the timekeeping function. The detected current position and date/time is recorded as photographing location information and photographing date/time information, with a correspondence to the photographic image data obtained by the photographing, onto a recording media 20.

In the timing of having taken a constant count of pictures or ended a day's photographing, the cameraman 12 forwards a recording media 20 to the control center where the order processing apparatus 24 is set up. The operator in the control center, in turn, sets the recording media 20 sent from the cameraman 12 onto a media driver 28 of the order processing apparatus 24.

Figure 2:
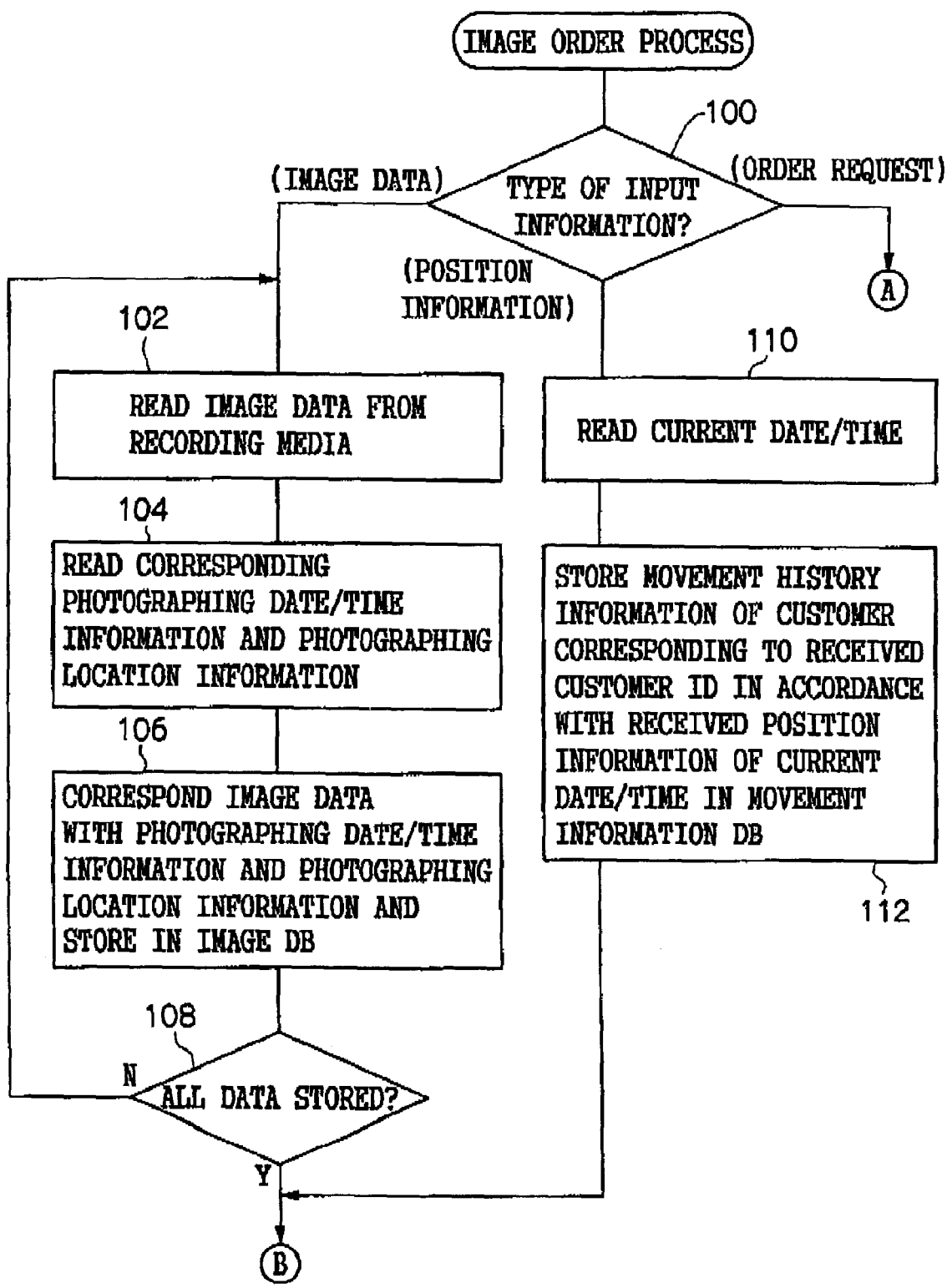
FIGS. 2 and 3 are a flow chart showing a content of an image order system according to the first embodiment.
Figure 3:
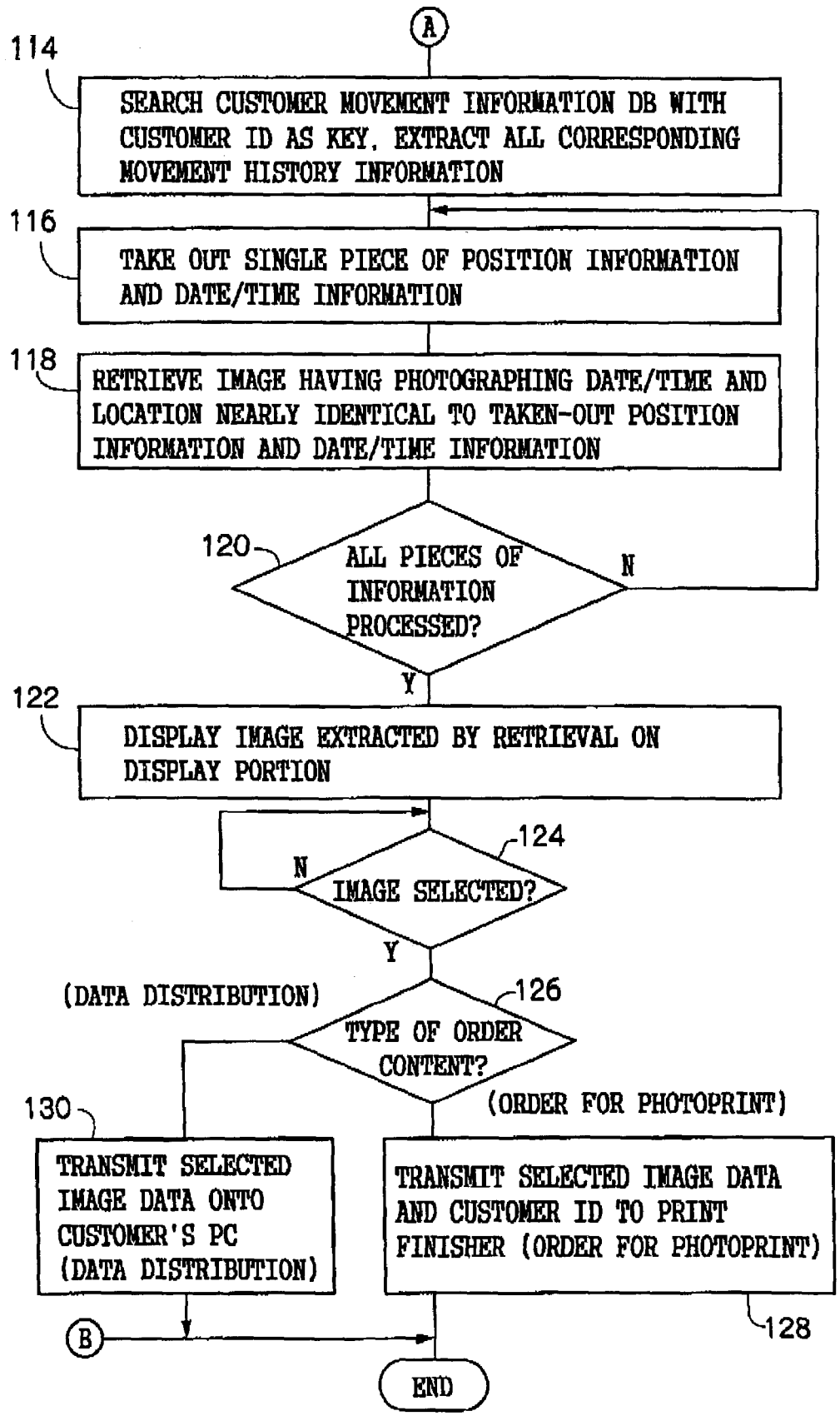

In the order processing apparatus 24, in case a recording media 20 is set onto the media driver 28 or receiving any piece of information from the outside (position information service center 50, order receiving terminal 42 or the like), an image order process shown in FIGS. 2 and 3 is started up. In the image order process, a type of input information is determined in step 100. In the case of staring up due to setting a recording media 20 onto the media driver 28, input information is determined as photographic image data, and the process moves to step 102.

In the step 102, a single piece of photographic image data is read out of the recording media 20. In the next step 104, photographing date/time information and photographing location information, which will be corresponded to and stored with the image data read out in step 102, are read out. Note that the step 104 corresponds to an acquiring component of the invention. In step 106, the photographic image data read in the step 102 is stored, with a correspondence to the photographing date/time and location pieces of information read in the step 104, to an image DB provided in the HDD 30. In this manner, the HDD 30 corresponds to an image data storage device of the invention.

In the next step 108, determination is made as to whether all the photographic image data recorded on the recording media 20 has been stored to the image DB or not. In the case the determination is negated, the process returns to the step 102, to repeat the steps 102-108 until the determination at the step 108 is affirmed. In case the determination at the step 108 becomes affirmative, the image order process is ended. Each time a recording media 20 is received from the cameraman 12, the above process is carried out. Due to this, as shown in the following Table 1, the photographic image data, photographing date/time and location pieces of information on all the images taken by the cameraman 12, are recorded to the image DB.

TABLE 1

<Image DB Content (Example)>

| Photographing Date/time | Photographing location | Photographic Image Data |
|---|---|---|
| $ymdt_1$ | $P_1$ | $D_1$ |
| $ymdt_2$ | $P_2$ | $D_2$ |
| . | . | . |
| . | . | . |
| . | . | . |

Incidentally, photographic image data, photographing date/time information and photographing location information are not limited to the acquirement through the recording media 20 as in the above. For example, photographic image data, photographing date/time and position pieces of information may be transmitted to the order processing apparatus 24, each time, for example, of taking a picture or taking a predetermined number of pictures or at an end of a day's photographing, depending upon the communication apparatus such as a cellular phone carried by the cameraman 12.

Description is now made on gathering movement histories of the individual customer. As mentioned before, each customer to the image order system 10 possesses a cellular phone 18 and is subscribed to a position information service offered by the cellular phone company. The position information service center 50 periodically transmits a current position of the individual customer to the order processing apparatus 24. Incidentally, in transmitting a customer's current position, the information identifying the customer (e.g. a customer No. uniquely given to the individual customer by the cellular phone company) is simultaneously transmitted in addition to the position information representative of a customer's current position.

In the order processing apparatus 24, when the information transmitting a customer's current position is received from the position information service center 50, the image order process is also started up. In this case, the process moves from step 100 to step 110. In the step 110, read out is a current date/time updated/held by the timekeeping function of the order processing apparatus 24.

In step 112, a customer ID (assigned to each customer individually by the image ordering system) for a customer, whose information was transmitted, is determined based on information received from the position information service center 50. Determining the customer ID can be performed by, for example: corresponding each individual customer ID with the information for specifying the customer received from the position information service center 50 and registering both pieces of corresponded information in a table; storing this table in the HDD 30; and retrieving the customer ID from the table using the received information as a key. The position information received from the position information service center 50 and the date/time information representative of a current date/time read out in step 110 are stored as movement history information corresponding to the customer ID determined before, to the customer movement information DB provided on the HDD 30, thus ending the image order process.

Incidentally, step 112 corresponds to a gathering component set forth in claim 2 (specifically, a gathering component set forth in claim 5) while the HDD 30 corresponds also to a movement history storage component set forth in claim 7.

By carrying out the above process each time a current position of an individual customer is transmitted from the position information service center 50, movement history information (a set of date/time information and position information, representative of a customer position at a certain date/time) is stored in plurality, based on each customer, to the customer movement information DB as shown in the following Table 2. By making a reference to a movement history information group stored in the customer movement information DB, determination is made possible for a movement history of each customer.

TABLE 2

<Customer Movement Information DB Content (Example)>

| Customer ID | Date/time | Position |
|---|---|---|
| A | $ymdt_{A1}$ | $P_{A1}$ |
|   | $ymdt_{A2}$ | $P_{A2}$ |
|   | . | . |
|   | . | . |
|   | . | . |
| B | $ymdt_{B1}$ | $P_{B1}$ |
| . | . | . |
| . | . | . |
| . | . | . |

Description is now made on a case a customer 16 places an order for an image obtained due to the photographing by the cameraman 12. In the first embodiment, there is an order receiving terminal 42 set up, as a terminal, to receive an order from a customer 16. In the case of placing an order for an image by the use of the order receiving terminal 42, a customer 16 inputs his/her customer ID through the input section 46, thereby request an order for an image the customer 16 himself/herself is taken as a subject, to the order processing apparatus 24.

Incidentally, customer cards or the like recording individual customer IDs may be previously distributed to the individual customers and the order receiving terminal 42 be provided with a card reader or the like to read a customer ID from a customer card, so that, by inserting a customer card carried by a customer into the card reader, the customer ID can be automatically inputted to the order receiving terminal 42. Also, the customer card or the like possessed by the customer may be added with an IC tag recording the information of the individual customer, such as customer ID, and the order receiving terminal 42 be provided with an IC tag sensor to read information out of the IC tag. Due to this, when a customer comes to an installation site of the order receiving terminal 42, the information, such as customer ID, can be read by the IC tag sensor from the IC tag added on the customer card or the like possessed by the arriving customer. With this configuration, the customer arrived can be automatically recognized without requiring for the customer to input the customer ID or insert the customer card in the card reader.

Meanwhile, in the first embodiment, placing an image order by the customer 16 is possible by the use of a cellular phone 18 or PC 48 possessed by the customer 16, besides using the order receiving terminal 2. Placing an order utilizing a cellular phone 18 or PC 48 is possible, for example, by accessing a Web page previously prepared for placing an image order and held in a predetermined Web server to input a customer ID in a customer ID input field provided on the predetermined Web page while the predetermined Web page is being displayed on a display portion of the cellular phone 18 or on a display of the PC 48.

When the customer 16 operates for placing an order for an image, information requesting an image order is sent together with the customer ID from the order receiving terminal 42, cellular phone 18 or PC 48 to the order processing apparatus 24. In the order processing apparatus 24, the image order process is started up. In this case, the process moves from step 100 to step 114 (see FIG. 3). In the step 114, retrieval is done through the customer movement information DB by using the received customer ID as a key. From the customer movement information DB, extracted are all the pieces of movement history information about the customer corresponding to the received customer ID.

In step 116, a single piece of movement history information (set of position information and date/time information) is taken out of the movement history information group extracted in the step 114. In the next step 118, the movement history information taken in the step 116 is collated with the photographing date/time and location pieces of information which is corresponded with photographic image data and stored in the image DB, thereby determining whether or not there is a general agreement in the date/time and position. This determination is carried out for all of the photographic image data stored in the image DB. By performing this determination, whether or not the photographic image data, the photographing date/time and photographing location of which substantially agrees with the position and date/time expressed by the movement history information read out in step 116, has been stored in the image DB is searched. In case there is photographic image data meeting the retrieval condition in the image DB, the relevant photographic image data is read out of the image DB and temporarily stored to the RAM 24 or the like. This step 118 corresponds to an identifying device of the invention (specifically, identifying device set forth in claims 4 and 7).

In the next step 120, determination is made whether or not the above process has been made on all the pieces of movement history information extracted in the step 114. In the case the determination is negated, the process returns to the step 116 to repeat the steps 116-120 until the determination in the step 120 becomes affirmative. This extracts all the photographic image data of the images having high possibility the customer requesting an order for an image is taken as a subject.

In case the determination of the step 120 is affirmed, the process moves to step 122. In the step 122, the photographic image data extracted by the search in step 118 is used to generate index image data, which represents an index displayed image (i.e., images are reduced, arranged in a matrix, and displayed), for each of the images represented by the photographic image data. The generated indexed image data is transferred to the apparatus as a source of order request (order receiving terminal 42, cellular phone 18 or PC 48). Thus, the indexed image is displayed on a display portion of the apparatus as a source of order request (display 44 of the order receiving terminal 42, display portion of the cellular phone 18 or display of the PC 48). Note that the step 122 corresponds to a display control component).

Also, the order processing apparatus 24 causes the display portion of the apparatus as a source of order request to display a message requesting the customer 16 to select an image as a subject of order, together with the indexed image. In the next step 124, determination is made whether an image as a subject of order has been selected by the customer 16 or not. Then an affirmative determination is waited for. The customer 16 makes a reference to the index image displayed on the display portion of the apparatus as a source of order request. The individual images being displayed as index images, in any, are the images having high possibility with which the customer 16 is taken as a subject. Hence, the customer 16 is allowed to easily find an image for order. Then, the customer 16 operates the input part of the order-requesting apparatus (input part 46 of the order receiving terminal 42, operation key of the cellular phone 18 or keyboard of the PC 48) to select an image as a subject of order, and simultaneously instructs an order type for the selected image (whether to make a photoprint or deliver the image data of a photographic image).

Incidentally, when the order type is to "Make a Photoprint", simultaneously instructed are "Number of Prints" and "Print Reception Way" (e.g. delivery is desired to a home of the customer 16, reception at the nearest convenience store, or the like). In the case the order type is to "Deliver Image Data", simultaneously instructed is the information for specifying a destination of transmission of the ordered image data (e.g. e-mail address of the customer 16).

In case an image as a subject of order is selected by the customer 16, the determination at the step 124 is affirmed and the process moves to step 126. In the step 126, determined is a content of the order placed by the customer 16. When the order by the customer 16 is to "Make a Photoprint", the process moves to step 128. In the step 128, a print finisher 36 optimal for this print order is selected from among a multiplicity of print finishers 36 depending upon the "Print Reception Way" received from the order-requesting apparatus, the customer's address specified by the customer ID) and so on. To the PC 38 of a selected print finisher 36, transmitted are the photographic image data selected as a subject of order by the customer 16, the information representative of an order content specified by the customer 16 and the customer ID of the customer 16. This places an order for photoprint, by the customer.

The print finisher 36, received the above information by the PC 38 through the communication network 32, uses received photographic image data to make photoprints in the number specified by "Number of Prints" in a size specified by "Print Size" of the received information representative of an order content. The print finisher 36 delivers the completed photoprints to a predetermined destination so that the customer 16 can receive the photoprints by the reception way specified in the "Print Reception Way". Due to this, the customer 16 can receive the photoprints of an image selected as a subject of order (image the customer 16 himself/herself is taken as a subject) under a condition (size, number, reception way) meeting the specified order content.

Meanwhile, in the case the order by the customer 16 is to "Deliver Image Data", the process moves from step 126 to step 130. In the step 130, the photographic image data of an image selected as a subject of order by the customer 16 is transmitted to a destination designated by the customer 16. This allows the customer 16 to receive the photographic image data of an image selected as a subject of order (image the customer 16 himself/herself is taken as a subject) through the PC 48 or cellular phone 18. Incidentally, the photographic image data to be delivered to the customer 16 may be subjected to a predetermined image process (e.g. enlargement/reduction, trimming, image processing for improving image quality). The foregoing steps 126-130 correspond to a processing component set forth in claim 12.

Incidentally, the first embodiment described on the case to retrieve, when a customer ID is designated, an image having, as a subject, the customer 16 corresponding to the designated customer ID. However, the invention is not limited to this. For example, when the order processing apparatus 24 is in waiting wherein no external information is being received or so, the order processing apparatus 24 may collate the photographing date/time and location stored, with a correspondence to individual one of photographic image data, in the image DB with the movement history information of the individual customer. This can identify a person as a subject among a multiplicity of customers 16 in an image as represented by individual one of photographic image data.

Meanwhile, the first embodiment described on the case to acquire a movement history of an individual customer by the utilization of a position information service provided by the cellular phone company. However, the invention is not limited to this. For example, the individual customer may possess a portable apparatus (corresponding to a portable apparatus set forth in claim 10) mounting a GPS function (corresponding to a position detecting component set forth in claim 10) to detect a current position at least by utilizing a GPS system so that the GPS function of the portable apparatus can detect a current position at a constant time interval thereby acquiring an individual customer's movement history. The movement history acquiring scheme may be employed, for example, a scheme to acquire a movement history by periodical transmission of movement history information from a portable apparatus possessed by the individual customer to the order processing apparatus 24. Also, in this form, it is possible to employ a scheme that, when a customer places an order through the order receiving terminal 42 or the like, the order receiving terminal 42 or the like reads out the movement history information cumulatively stored in the portable apparatus thereby acquiring a movement history.

Meanwhile, in the case that the scope the cameraman 12 takes pictures is limited to a constant region, e.g. in a theme park or public garden, the configuration may be made as in the following similarly to the second embodiment to be explained below. Namely, each customer existing in the constant region is provided with a transmitter to transmit a signal including a predetermined ID (the transmitter can be embedded in an admission ticket to the constant region).

Also, base stations for receiving signals transmitted from the transmitters are set up in multiplicity at a constant interval within the constant region. A current position of an individual customer is detected by determining at which base station a signal transmitted from an individual customer is being received. This is repeated at a constant time interval, thereby acquring a movement history of each customer.

Furthermore, the first embodiment described on the case to detect a photographing location and date/time by the GPS and timekeeping functions mounted on the DSC 14 carried by the cameraman 12. However, the invention may be configured as follows. In the case that the scope the cameraman 12 takes pictures is limited within a constant region, a multiplicity of base stations are set up nearly at a constant interval within the constant region as in the second embodiment to be next described. During photographing, a predetermined signal including an image ID for identifying an individual photographic image is sent from the DSC 14 to the base station. On the side of the order processing apparatus 24, a photographing location is detected by determining which base station has received a signal. On the other hand, a photographing date/time is determined by determining a date/time the base station has received the signal. The photographing location and date-and-position are cumulatively stored, with a correspondence to the received image ID, to the image DB.

Also, the first embodiment described on the case that the order processing apparatus 24 gathers movement histories of the individual customers and cumulatively store them to the customer movement information DB. However, the invention is not limited to this but may be configured as follows. Instead of gathering customers' movement histories, the information representative of a customer's movement history inputted on the basis of his or her memory (e.g. information of "Gone to Δ○ (month)×(day)": this also corresponds to a "movement history of a person" of the invention) may be collated with a photographing date/time and position of each of photographic image data. This can retrieve an image having high possibility with which the customer is taken as a subject.

Meanwhile, although the first embodiment extracted an image having high possibility with which the customer is taken as a subject merely on the basis of collation in date/time and position, other pieces of information may be used in extracting an image concerned. For example, the customer is made to input a color or the like of the day's costume. For an image extracted by collation in date/time and position, extracted is a region to be presumed corresponding to a face of the customer (face region) by a known face-region extracting process. Depending upon a position and size of an extracted face region, determined is a region presumed corresponding to the customer's body (body region). Determination is made as to whether or not the coloring in the body region coincide with or similar to a costume color inputted by the customer. Due to this, narrowed down are the images having high possibility with which the customer is taken as a subject.

Furthermore, the first embodiment describes on the example that, when there is an order request from a customer, photographic image data of an image having high possibility with which the customer requesting image order is taken as a subject is extracted and displayed on the display portion of the order-requesting apparatus. However, the invention is not limited to this but may be configured as follows. Namely, extracted may be an image having a certain person (customer himself/herself or person the customer previously registered) as a subject without waiting for an order request from the customer. The extracted image is automatically distributed onto a cellular phone 18 or PC 48 possessed by the customer through a communication network such as the Internet. This form corresponds to the invention set forth in claim 15. Meanwhile, at this time, it is preferred to attach a program for the customer to place an order for an image.

According to the foregoing form, the following effect is available. For example, when the customer goes to a particular facility such as a sightseeing resort, theme park, event hall or public garden, the cameraman 12 takes a picture of a customer as a subject. Thereafter, the image obtained by the shot, with the program, is transmitted (distributed), by being attached e.g. on an e-mail, onto the cellular phone 18 or PC 48 possessed by the customer. The customer having recognized an e-mail arrival opens the attached file. When the attached file is opened, the image obtained by the shot is displayed on the display portion. Subsequently, the program is executed. This displays a message prompting the customer to place an order. Thus, the customer is allowed to place an order for the distributed image. In the above form, because an image is distributed onto the customer's cellular phone 18 or PC 48, it is possible to increase the occasions for the customer to place an order for an image.

In the above form, the distributed image is not limited to an indexed image, in which still images are contracted and arranged in a matrix form as explained before. Instead, the image may be distributed by being edited in an image configuration as in an album. Besides, it is possible to synthesize with data, such as an image, a character, voice, a text or the like (e.g. adding an explanatory message concerning a shot date/time and position, image decoration such as a fringe decoration or advertisements), to exemplify a image with special effects (e.g. graduation effect, watercolor/oil-color effect, a monochromatic, etc.), to add moving image data, or to sequentially reproduce and display a plurality of still images at a predetermined time interval on the display portion just like a slide show. Meanwhile, the image, character, voice or text to be synthesized on a distributed image, the motion picture to be added on a distributed image or the like may be selected according to an event (the event can be judged from a shot date/time or position), date/time and location when photographing (e.g. a shot position is in a particular theme park, a character of the particular theme park is combined, a motion picture advertising the particular theme park is added or so). Meanwhile, the image to be distributed may be a moving image. In the case of distributing a moving image, it may be edited and distributed in an on-screen configuration such as a home movie or be distributed with the above data combination (the data to be combined preferably is a motion image). Also, the customer may be allowed to previously select as to data combination, presence or absence of exemplification with special effects, or a kind thereof. By thus editing a distributed image, entertainingness of image distribution can be improved thus realizing for the customer to have an increased motive toward placing an order for images.

Second Embodiment

Figure 4:
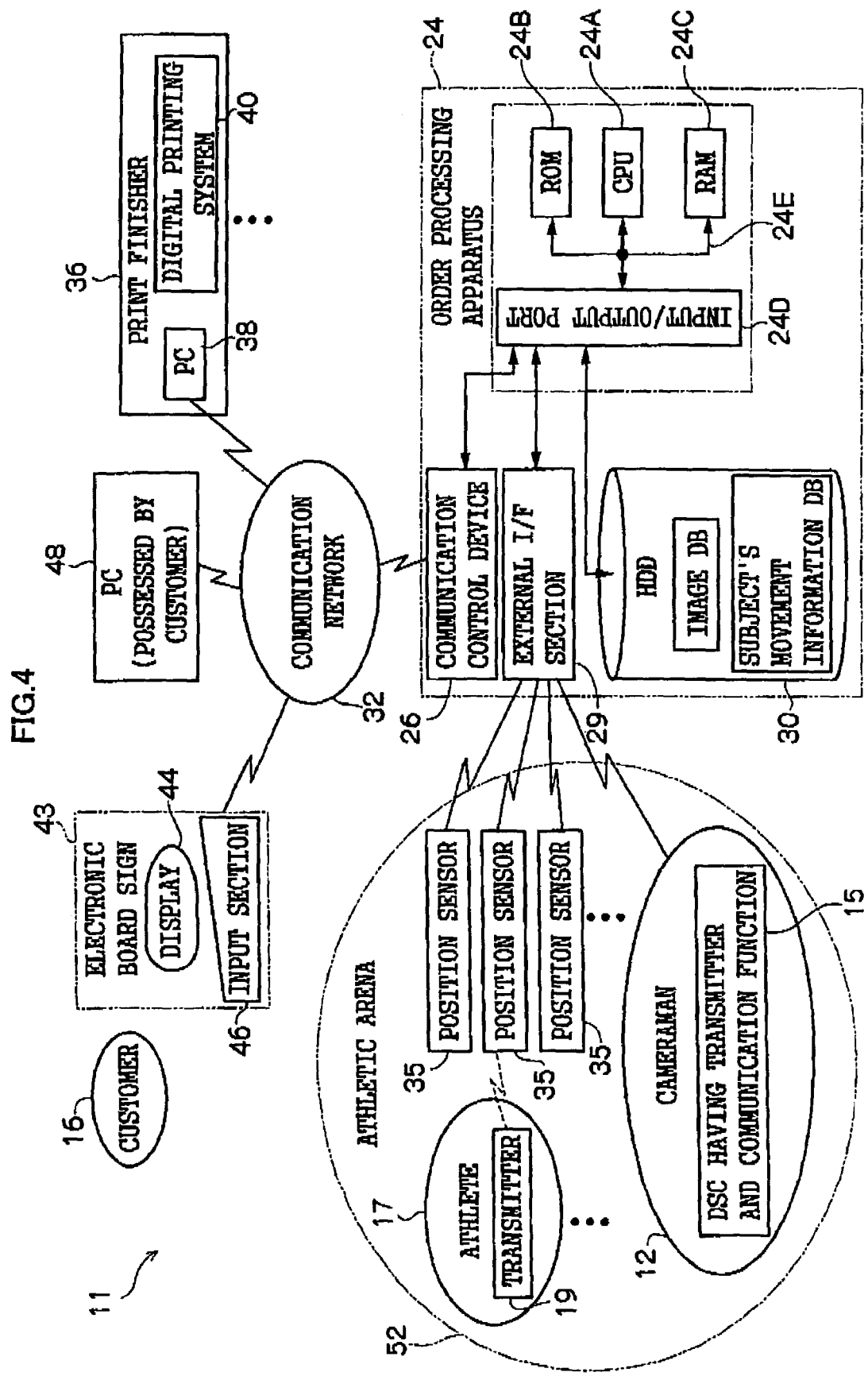
FIG. 4 is a schematic block diagram of an image order system according to a second embodiment.

A second embodiment of the invention will now be described. Note that the same elements as those of the first embodiment are attached with the same reference numbers, and explanations thereof are omitted. There is shown, in FIG. 4, an image order system 11 according to the second embodiment. In the second embodiment, a cameraman 12 takes a picture of an athlete 17 as a subject in an athletic arena 52 where a desired sport game (e.g. baseball, soccer, field-and-track event) is held. An image order system 11 of the second embodiment is a system allowing a customer 16 to place an order for an image obtained in the foregoing picture.

Each athlete 17, a subject in the second embodiment, possesses a transmitter 19 always transmitting a predetermined signal including an athlete ID to identify an individual athlete 17. The transmitter 19 is embedded, for example, in a uniform, number sheet or shoe, in order not to obstacle to the playing athlete 17. In an underground of the area 52, a multiplicity of position sensors 35 are buried at a constant interval (e.g. at an interval of approximately several meters) to receive a signal sent from the transmitter 19. The multiplicity of position sensors 35 are each connected to an external I/F section 29 of an order processing apparatus 24.

Meanwhile, the cameraman 12 carries a digital still camera (DSC) 15. The DSC 15 incorporates a transmitter always transmitting a predetermined signal including a camera ID, similarly to the above transmitter 19. The foregoing position sensor 35 receives also a signal sent from the DSC 15. The DSC 15 also has a function to radio-communicate with the external I/P section 29 of the order processing apparatus 24 and a function to detect an azimuth and photographing magnification upon taking a picture.

Furthermore, the image order system 11 of the second embodiment has an electronic board sign 43 set up in a location nearby an entrance/exit of the athletic arena 52, in place of the order receiving terminal 42 described in the first embodiment. The electronic board sign 43 also has an input section 46 configured with a display 44 large in screen capable of displaying images and the like and a keyboard for a customer to input desired information, having a function to communicate with the order processing apparatus 24 through a communication network 32.

Description is now made on the operation of the second embodiment. When an athletic game by athletes 17 begins in the athletic arena 52, a cameraman 12 takes pictures of the athletes 17 as subjects while moving in the athletic arena 52. In this duration, the transmitter 19 carried by the athlete 17 and the DSC 15 carried by the cameraman 12 transmit predetermined signals at all times. The transmission signal is received by a position sensor 35 existing in a nearest location to an athlete 17 or a current position of the cameraman 12.

In the HDD 30 of the order processing apparatus 24, there is provided a subject-movement information DB in place of the customer movement information DB explained in the first embodiment. The order processing apparatus 24 always determines as to which one of the position sensors 35 provided in multiplicity is receiving a signal transmitted from the transmitter 19 of each athlete 17. This detects a current position of each athlete 17. The detected current position is put in a correspondence to date/time information representative of a current date/time, and stored as subject-position information to the subject-movement information DB. The storing is repeated with a predetermined period.

In this manner, the transmitter 19 possessed by the athlete 17 corresponds to a portable communication apparatus set forth in claim 9 while the position sensor 35 to a base station set forth in claim 9. Incidentally, the position of each cameraman 12 (and DSC 15) may be always stored as detected information, similarly to the above.

Figure 5:
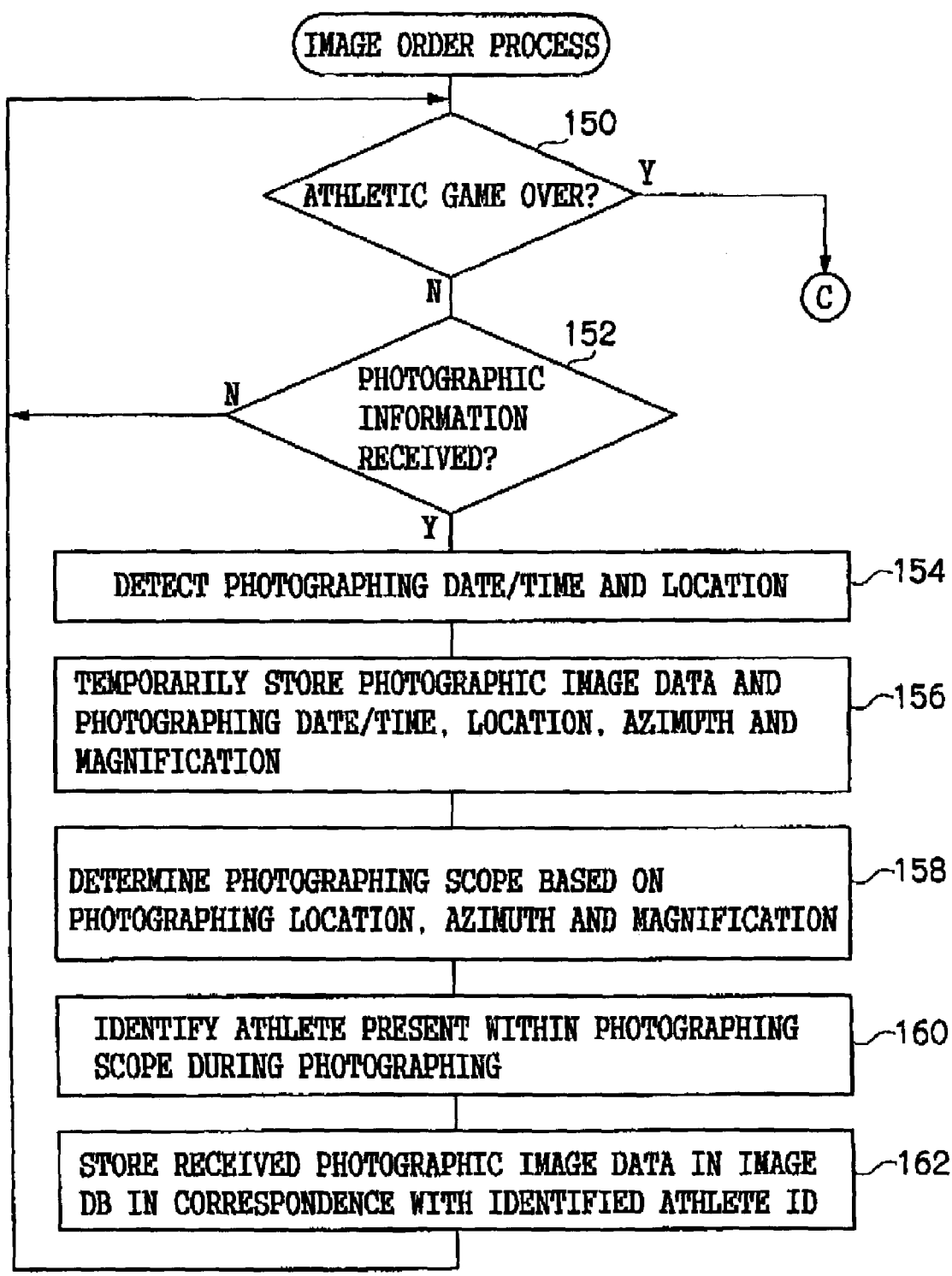
FIGS. 5 and 6 are a flow chart showing a content of an image order system according to the second embodiment.
Figure 6:
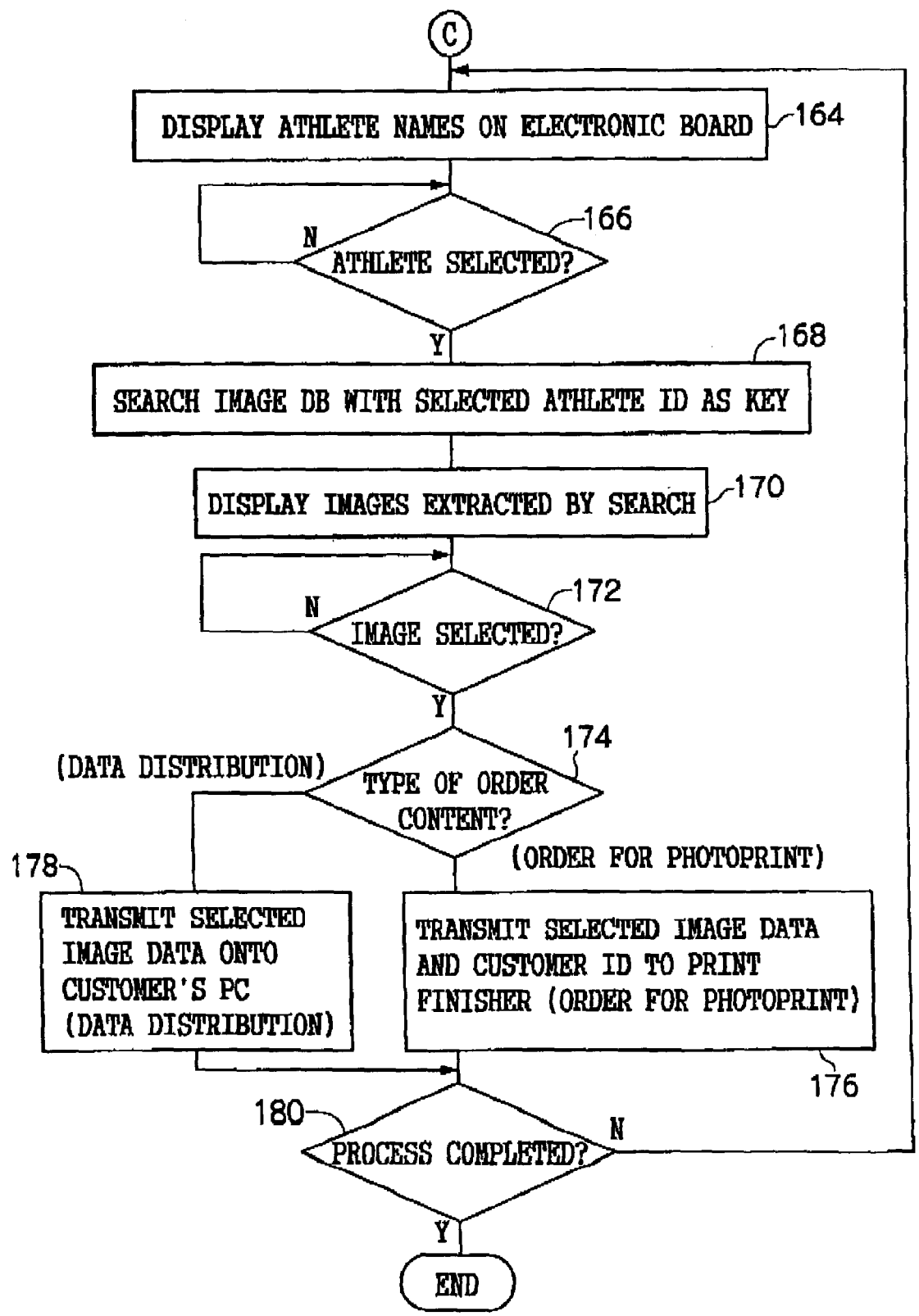

Description is now made on an image order process to be executed by the order processing apparatus 24 of the second embodiment, with reference to a flowchart of FIGS. 5 and 6. In step 150, determined is whether or not athletic game is over in the athletic arena 52. When the determination is negated, the process moves to step 152. Determined is whether or not photographic information has been received from the DSC 15 of the cameraman 12. When the determination is negated, the process returns to the step 150 to repeat the steps 150, 152 until any of the determination is affirmed.

The DSC 15 of the second embodiment, when a picture is taken (of an athlete 17 as a subject) by the cameraman 12, detected are an azimuth and a magnification upon the photographing. The photographing azimuth information representative of a detected azimuth and the photographing magnification information representative of a detected photographing magnification are sent, together with photographic image data obtained by photographing, to the order processing apparatus 24. In case the above information (referred to as photographic information) is received through the external I/F section 29, the determination in the step 152 is affirmed and the process moves to step 154. Note that a photographing azimuth can be detected by using a gyro (may be any of schemes of mechanical, optical, fluidal, vibratory and so on) or by detecting a ground magnetism.

In the step 154, a current position of the cameraman 12 and DSC 15 (photographing location) is determined depending upon by which one of the multiplicity of position sensors 35 is received a predetermined signal transmitted from the DSC 15 having transmitted the photographic information. Simultaneously, a current date/time is detected as a photographing date/time. Note that the step 154, including the process of receiving photographic information from the DSC 15, corresponds to an acquiring component of the invention (specifically, acquiring component set forth in claim 11). In the next step 156, the photographing location and date/time pieces of information representative of photographing location and date/time detected in the step 154 is temporarily stored together with the photographic image data, photographing azimuth and photographing magnification pieces of information received from the DSC 15, to the RAM 24C.

In the next step 158, a scope of the athletic arena 52 taken in this shot is determined depending upon the photographing position information, photographing azimuth information and photographing magnification information among the information temporarily stored in the step 156. In step 160, information representative of a position of each athlete 17 at photographing date/time is extracted as subject position information from the information stored in the subject-movement information DB. The subject position information is collated with the information representative of the photographing scope determined in the step 158. Each athlete 17 is determined as to whether or not the athlete 17 at photographing has been within the photographing scope. This identifies an athlete 17 as a subject in this photographing (photographic image represented by the received photographic image data). The step 160 corresponds to an identifying device of the invention.

Incidentally, it is often the cases to take pictures of a plurality of athletes 17 as main subjects in the photographing in a team sport. However, other athletes than the main subjects possibly enter within the photographing scope. The other athletes, in certain cases, are taken as a background of a photographic image. In identifying an athlete as a subject for a photographic image as in the above, there is a possible desire to avoid the other athlete taken in the background from being recognized as a subject. This is carried out as follows. For example, from a plurality of athletes 17 determined as existing within the scope upon photographing, excluded is an athlete who is greatly different, in a distance between a position upon photographing and a photographing location, from other athletes. Otherwise, excluded may be an athlete who is greatly different in a distance between a position upon photographing and a photographing location from a distance to the subject measured by an AF mechanism during photographing.

In the next step 162, the received photographic image data is stored, with a correspondence to an ID of an athlete 17 determined as a subject in the step 160, to the image DB. The process returns to step 150. Due to this, while the athletic game is played in the athletic arena 52, the steps 154-162 are repeated each time the cameraman 12 takes a picture. Thus, an athlete 17 is identified as a subject. Consequently, cumulative storing of photographic image data with a correspondence to an athlete 17 ID is repeated.

When athletic game is over in the athletic arena 52 (photographing by the cameraman 12 is completed), the determination in the step 150 becomes affirmative and the process moves to step 164. In the step 164, the names, face pictures and the like of all the athletes 17 having played in the athletic arena 52 are displayed in a list on the display 44 of the electronic board sign 43. In the next step 166, it is determined whether or not any athlete is selected by a customer 16 (e.g. a person having watched the game played in the athletic arena 52) come to the installation site of the electronic board sign 43, thus waiting for an affirmative determination.

In case the customer having arrived at the installation site of the electronic board sign 43 selects a particular athlete 17 from among all the athletes 17 list-displayed in order to place an order for an image of a particular athlete, the determination in the step 166 is affirmed and the process moves to step 168. In the step 168, retrieval is made through the image DB by using, as a key, an ID of the particular athlete 17 selected by the customer 16. Extracted are all the photographic image data stored, with a correspondence to the ID of the particular athlete. In the next step 170, the images represented by the photographic image data extracted by retrieval are displayed in list on the display 44. This list-displays only the images having a particular athlete 17 as a subject, on the display 44. Thus, it is easy for the customer 16 to find an image desired for placing an order. Incidentally, the step 170 corresponds to a display control component set forth in claim 12.

The next steps 172-178 are nearly the same as the steps 124-130 explained in the first embodiment, and hence briefly described. Namely, determined is whether an image to be ordered is selected by the customer 16 or not (step 172). In case an image to be ordered is selected by the customer 16, determined is a content of the order placed by the customer 16 (step 174). In the case the order by the customer 16 is to "Make a Photoprint", a print finisher 36 is selected in step 176. Transmitted are the photographic image data of an image as a subject of order, the information representative of an order content designated by the customer 16 and a customer ID of the customer 16 onto the PC 38 of the selected print finisher 36. Due to this, an order for photoprint is placed from the customer 16. Meanwhile, in the case the order by the customer 16 is to "Deliver Image Data", the photographic image data of an image as a subject of order is sent, in step 178, to a destination of transmission designated by the customer 16. The steps 174-178 correspond to a process component set forth in claim 12.

In the next step 180, determined is whether to end the process or not. The step 180 is unconditionally negated within a predetermined time from game over, and the process returns to the step 164. Due to this, the customers who visited the athletic arena 52 and watched the game are each allowed to get an image having a desired athlete 17 as a subject.

Incidentally, the second embodiment described only on the electronic board sign 43 as an apparatus to place an order for an image in order to simplify explanation. However, image order may be placed by accessing a Web page for a customer to place an order as in the first embodiment.

Also, in the second embodiment, the athlete 17 was made to carry the transmitter 19 to detect a position of the athlete 17 by the position sensor 35. However, the invention is not limited to this but may be configured as follows. Namely, a multiplicity of transmitters may be set up on a side of the athletic arena 52. A signal including position information representative of a position of each transmitter is transmitted from the transmitter. The signal from the transmitter is received to record the position information included in the received signal, with a correspondence to a current date/time. The receiver having a function repeating the above with a predetermined period is possessed by each athlete 17. After the game in the athletic arena 52 is over, the receivers are collected. By reading out recorded information (information representative of movement histories of each individual athlete 17), the movement histories of each individual athlete may be acquired. Meanwhile, in place of reading out information from the receiver after the game is over, recorded information may be periodically sent from the receiver.

Meanwhile, the way of detecting a photographing location is not limited to the method described in the embodiments but may be configured as follows. Namely, the signals including position information representative of installation sites of base stations are respectively transmitted from the multiplicity of base stations to a plurality of mutually-different positions. The signals are received on the DSC side. Due to this, a photographing location is detected.

Furthermore, although the above exemplified the DSC 14 as photographing means carried by the cameraman 12, the invention is not limited to this. The photographing means may use an ordinary camera to record images on a photographic film by exposure, or digital video camera.

Particularly, in the case of using a digital video camera as photographing means, the invention is applied to each image of the moving images obtained by photographing to determine a subject. The information for identifying a determined subject (subject ID) is stored, with a correspondence to the individual image. This facilitates to retrieve a scene in which a particular subject is taken a picture of or edit a moving image based on each subject.

Meanwhile, in the case of using a digital video camera as photographing means, an order for a moving image will be placed by a customer. Distributing a moving image may be achieved by recording a moving image on a video tape and forwarding it to a customer. Also, the moving image may be distributed by entrusting a cable television (CATV) broadcaster or utilizing the Internet. Specifically, in the case, for example, a customer places an order for a moving image of a particular athlete through the electronic board sign 43, recording means is notified the information (broadcast channel or broadcast date/time, etc.) for reserving to record an ordered moving image onto recording means (e.g. video recorder, PC or the like) possessed by the customer. Simultaneously, for example, a key for descrambling a moving image to be broadcast with scrambling is notified. In this case, the recording means receives a broadcast over a notified broadcast channel at a notified broadcast date/time, and carries out recording after releasing the scramble by the use of a notified key. This allows the customer to get the moving image the customer has placed an order.

Meanwhile, although the above described on the case the cameraman 12 takes pictures, the invention is not limited to this. It is naturally possible to use a camera having, as photographing means, a sensor to detect a person as a subject so that, when the sensor detects a person, the detected person can be automatically taken a picture (this camera may be any of a DSC, an ordinary camera for recording, by exposure, an image on a photographic film and a digital video camera, similarly to the above).

Meanwhile, in the second embodiment, there is a possibility to cause a somewhat time lag from a photographing by a cameraman 12 to a recognition of a photographing by the order processing apparatus 24 after receiving the photographing information from the DSC 15. Particularly, for an athletic game with fierce movement, there is a possibility to lower the accuracy of identifying a subject due to such a time lag. For this reason, the second embodiment described on the case to sequentially store detected subject (athlete 17) positions to the subject-movement information DB. However, the subject-position detecting scheme explained in the second embodiment can detect at real time a position of an individual subject (individual athlete 17 in the example of second embodiment). This, if utilized, makes it possible to control at real time a photographing azimuth, focal point and photographing magnification of the photographing means depending upon such a real-time detected position of a particular subject that a particular subject is real-time detected in position and the particular subject always exists in a proper size within a photographing scope (in a manner automatically tracking the particular subject).

It is possible to apply to a case with automatic photographing, for example, by the photographing means to control at real time a photographing azimuth, focal point and photographing magnification of the photographing means such that a particular subject is real-time detected in position and the particular subject always exists in a proper size within a photographing scope. However, the result of real-time detection of a subject position is utilizable in assisting for a photographing person (e.g. cameraman 12 or customer 16 who comes to the athletic arena 52) to take a picture of a particular subject.

Specifically, for example, in the case of taking a picture of an athlete 17 as a subject in the athletic arena 52 as in the second embodiment, the apparatus centrally controlling information as the order processing apparatus 24 explained in the second embodiment (hereinafter, referred to as control apparatus) detects at real time a position of each athlete 17 as a subject by the transmitter 19 and position sensor 35 explained in the second embodiment (may be applicable IC tags possessed by the individual athletes 17 in place of the transmitter 19 and IC tag sensors buried in the athletic arena 52 in place of the position sensors 35). It also detects at real time a position of an individual photographing person (and DSC 15) by a predetermined signal transmitted from the DSC 15 carried by each photographing person Incidentally, in place of the predetermined signal transmitted from the DSC 15, a position of each photographing person (and DSC 15) may be detected by an IC tag carried by an individual photographing person and the IC tag sensors buried in the athletic arena 52.

Also, the control apparatus adds the identification information for identifying an individual athlete 17 to the real-time detected position information representative of a position of an individual athlete 17, to periodically (e.g. with a period of several milliseconds to several seconds) transmit it to the DSC 15 carried by an individual photographing person, together with the position information representative of a position of the DSC 15 itself as a destination of transmission (position of the photographing person carrying the DSC 15). Incidentally, concerning position information of an athlete 17, there is no limitation to transmitting position information of all the athletes 17 to the individual DSCs 15. Only the position information of a particular athlete 17 designated by the individual photographing person may be transmitted to the DSC 15 of the individual photographing person.

Figure 7:
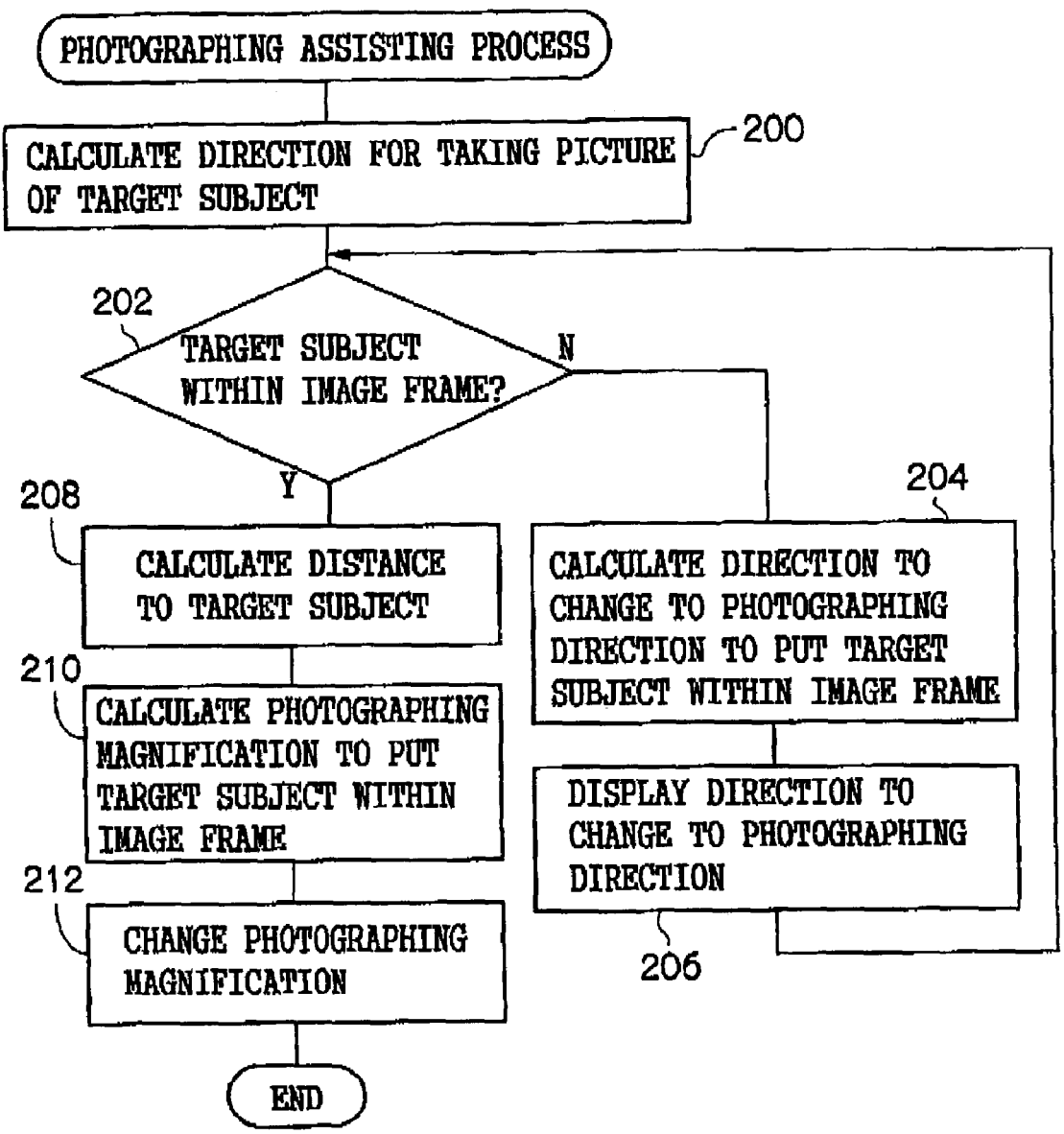
FIG. 7 is a flowchart showing a content of a photographing assist process to be executed on a camera depending upon a result of real-time detection of a subject position.

Meanwhile, the DSC 15 executes a photographing assisting process shown in FIG. 7 each time receiving position information of an athlete 17 and position information of a DSC 15 itself from the control apparatus. The photographing assisting process is now described. In step 200, the position information of an athlete 17 (target subject) as a photographic subject previously registered in the DSC 15 is extracted from the position information of athletes 17 received from the control apparatus (extracting position information is not required in the case only the position information of an athlete 17 as a photographic subject is received from the control apparatus). Depending on the position information of the athlete 17 as a photographic subject and of the DSC 15 itself, a direction of taking a picture of the athlete 17 as a photographic subject as viewed from a photographing person carrying the relevant DSC 15 (camera direction in which the target subject is to be taken a picture) is calculated.

Incidentally, although the camera direction may be a camera direction (camera azimuth angle) on a horizontal plane, a camera direction (camera elevation angle) on a vertical plane is desirably included in addition to the azimuth angle. The camera elevation angle can be calculated provided that an altitude can be detected for the athlete 17 as a photographic subject (target subject) and photographing person (DSC 15). The altitudes of the target subject and photographing person (DSC 15) can be simultaneously detected by detecting positions of the target subject and photographing person by utilizing a GPS system, for example. Also, in case an altitude at each position in the athletic arena 52 is known, an altitude of the target subject and photographing person can be detected from a position (position on a horizontal plane) of the target subject and photographing person.

The DSC 15 incorporates a gyro sensor to detect a camera direction. In step 202, a current camera direction of the DSC 15 is captured from the gyro sensor. The current camera direction captured is compared with the camera direction for taking a target subject calculated in step 200, thereby determining whether or not the target subject, in the current DSC 15 direction, is within a photographing frame representative of a predetermined photographing scope.

Figure 8A:
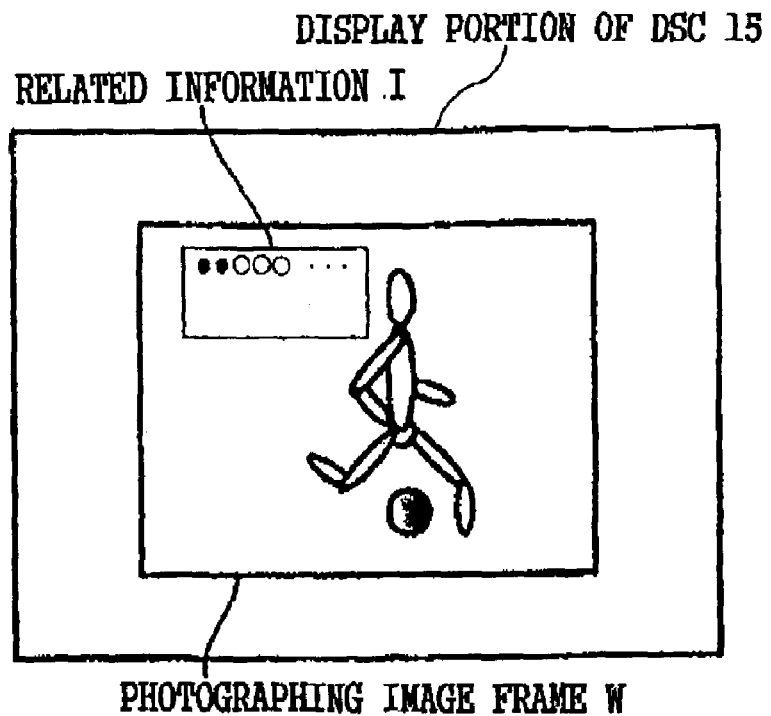
FIGS. 8A and 8B are image diagrams showing one example of an image to be displayed on a display section of the camera by the photographing assist process of FIG. 7.
Figure 8B:
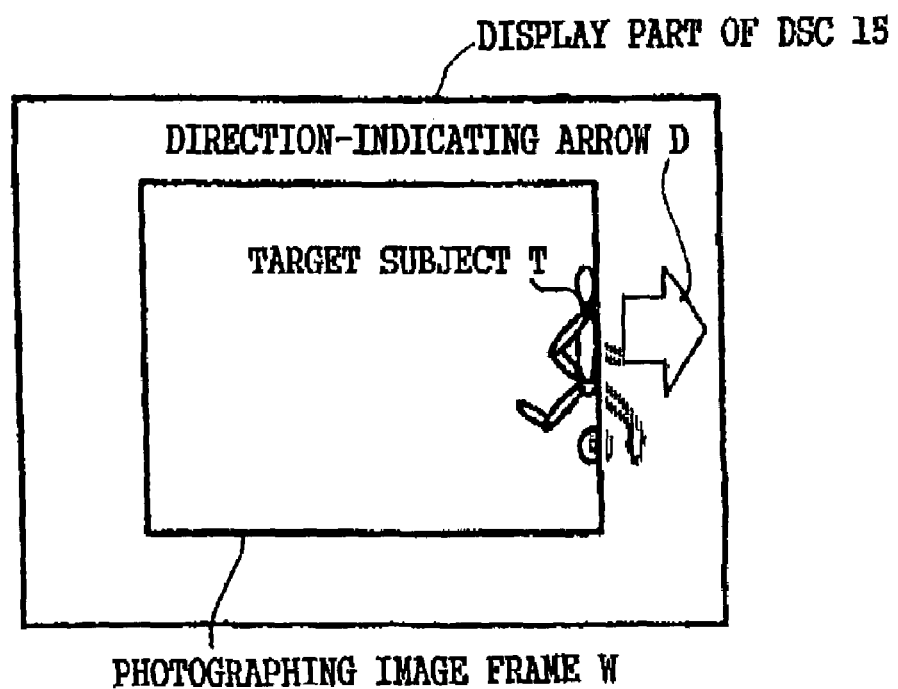

In the case the target subject, in the current camera direction, departs from the photographing frame as exemplified in FIG. 8B, the determination in the step 202 is negated and the process moves to step 204. In the step 204, a changing direction to camera direction (e.g. horizontally or vertically) is calculated to put the target subject within the photographing frame. In the next step 206, a direction-indicating arrow indicating the changing direction to camera direction calculated in step 204 is displayed on the display portion made of an LCD or the like of the DSC 15, and the process returns to the step 202. Accordingly, the steps 204, 206 are repeated until the target subject is determined to be within the photographing frame in the step 202.

FIG. 8B shows an example of an on-screen image displayed on the display portion of the DSC 15 by the process of the step 206. In the example of FIG. 8B, an image corresponding to a current photographing scope is being displayed within a photographing frame W, wherein, in a position corresponding to the changing direction to camera direction calculated in the step 204 at the outside of the photographing frame W, a direction-indicating arrow D is displayed indicating the changed camera direction. This allows the person who takes pictures to change (move) the photographing direction of the DSC 15 such that the DSC 15 directs towards the direction the direction-indicating arrow D indicates. Due to this, the target subject can be put within the photographing frame W thus allowing to take a picture of the target subject with easiness and positiveness. Incidentally, the direction-indicating arrow D may be changed in its display size or the like depending upon a deviation between a current direction of the DSC 15 and a camera direction for taking a picture of a target subject.

In the step 202, when the target subject is determined within the photographing frame (e.g. in a state as shown in FIG. 8A), the process moves to step 208. Incidentally, in this case, the information concerning the target subject (e.g. the information of a profile of a particular athlete 17 as a target subject) may be acquired from the control apparatus or the like and displayed as related information I on the display portion of the DSC 15 as exemplified in FIG. 8A. This improves the convenience for the person taking a picture.

In step 208, a distance from the DSC 15 to the target subject is calculated depending on the position information of the target subject and DSC 15 itself. In the next step 210, calculated is a photographing magnification for putting the target subject within the photographing frame W and making the target subject within the photographing frame W to a proper size (e.g. approximately a quarter in area ratio with respect to the photographing frame W), depending on the calculated distance to the target subject. In the next step 212, carried out is at least one of changing the optical magnification of a zoom lens of the DSC 15 and of changing the electronic magnification of an electronic zoom of the DSC 15, depending on an calculated photographing magnification. Thus, photographing magnification is changed on the DSC 15 to end the photographing assisting process.

Each time of receiving the position information of the athlete 17 and DSC 15 itself from the control apparatus, the foregoing photographing assisting process is carried out on the DSC 15. Consequently, the person taking a picture, even when losing a target subject, is allowed to put a target subject within the photographing frame W and positively take a picture of the target subject, by merely directing the DSC 15 toward a direction the direction-indicating arrow indicates.

Third to fifth Embodiments of the invention is now described with reference to the drawings. Note that the explanation herein is on a case the photographing system of the invention is applied as a system to take a picture of a particular athlete as a target subject in a soccer game.

Third Embodiment

Figure 9:
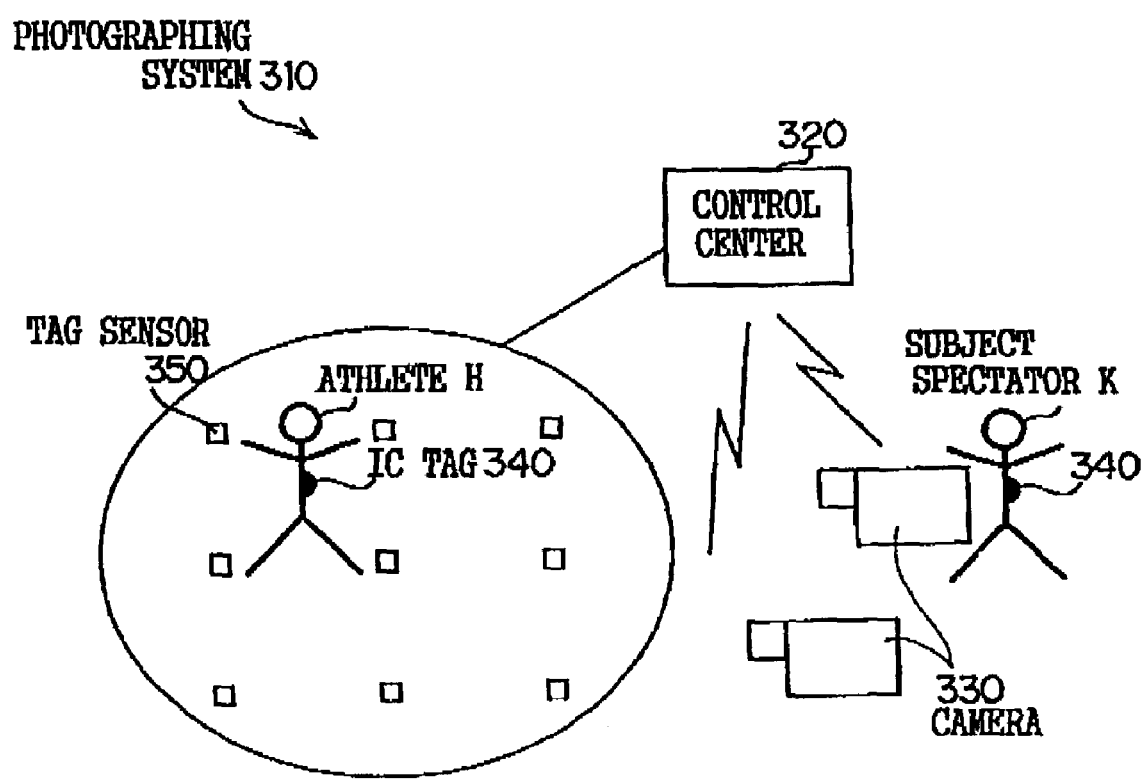
FIG. 9 is a typical view showing a configuration of a photographing system 10 according to an embodiment.

Referring to FIG. 9, first explained is an overall configuration of a photographing system 310 according to this embodiment. As shown in the figure, the photographing system 310 of this embodiment is configured including a control center 320 to manage the photographing system 310, a plurality of cameras 330, such as digital-still and digital-video cameras, which are carried by a plurality of spectators (hereinafter, referred to as "subject spectators") K as subjects of support in the photographing system 310 and usable in the photographing system 310, IC tags 340 each kept by every athlete H who is to appear in a soccer game or subject spectator K to transmit a radio signal representative of predetermined information, and a plurality of tag sensors 350 having a function to receive a radio signal transmitted from the IC tag 340 and provided over the soccer-game ground and on spectator seats.

Herein, the tag sensors 350 are buried at a predetermined interval (of 0.5 meter in this embodiment) in a two-dimensional matrix form throughout the ground and on all the spectator seats. Meanwhile, this embodiment is applied with IC tags 340 having a communication distance of approximately 1 meter.

Incidentally, the IC tag is a digital media utilizing an RFID (Radio Frequency Identification; automatic identification using radio waves) for non-contact communication to carry out product control, automatic identification or the like by exchanging digital information stored in an IC memory mounted therein.

In the photographing system 10 of this embodiment, such an IC tag 340 is possessed by each of the athletes H and subject spectators K. The control center 320 acquires a result of a radio signal reception by each tag sensor 350 so that a position of each athlete H or subject spectator K can be grasped in real-time in the control center 320.

The control center 320 transmits position information representative of a position of every athlete H and subject spectator K at a predetermined time interval (of 3 seconds in the embodiment) to every camera 330. The camera 330 derives a photographing direction and magnification to place an athlete, to be desirably taken a picture of (hereinafter, referred to as "target subject"), within a predetermined photographing scope depending upon position information received from the control center 320. The derived direction information representative of a photographing direction is displayed on a liquid-crystal display provided on the camera 330. Furthermore, the zoom magnification of an optical zoom is controlled to the derived magnification.

Note that this embodiment distributes an IC tag to each subject spectator K, in a form attached on a ticket to be kept by the subject spectator K.

Figure 10:
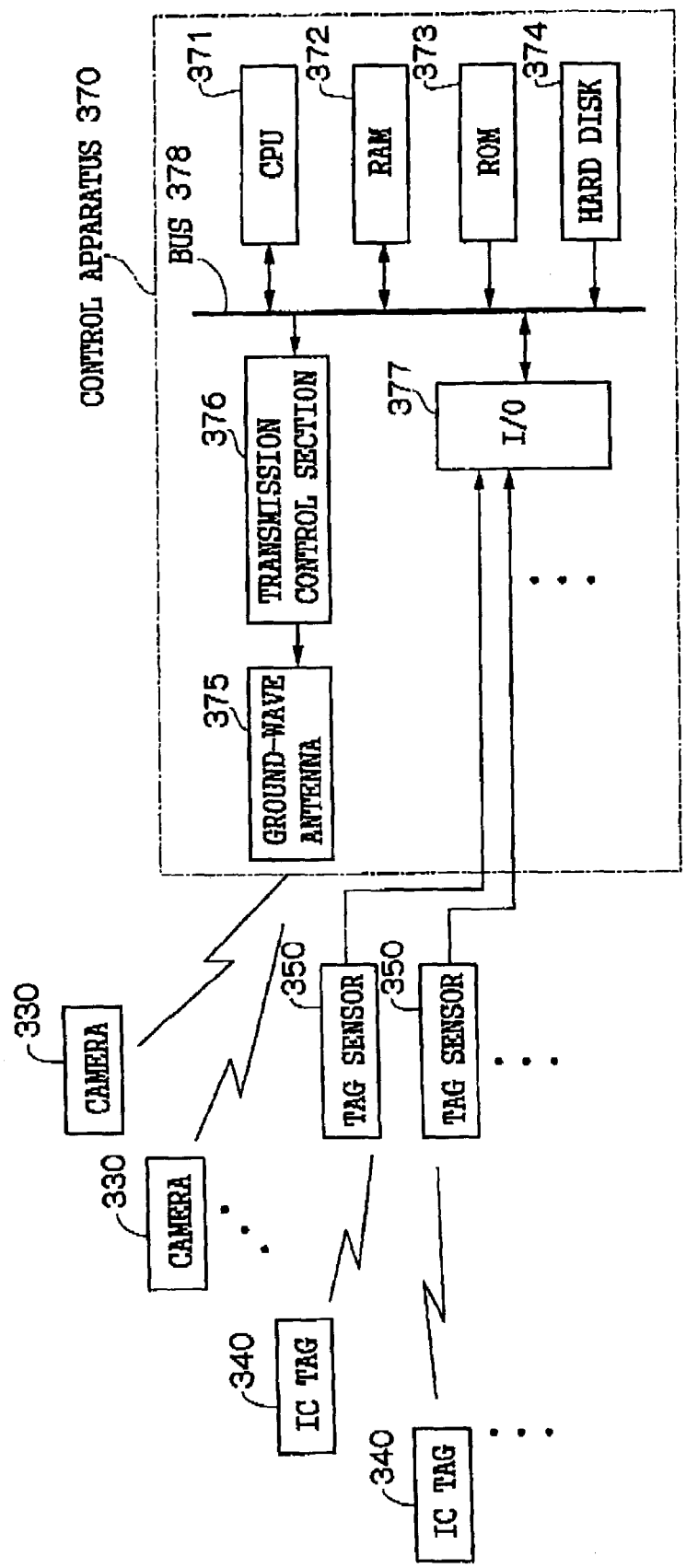
FIG. 10 is a block diagram showing a configuration of a control apparatus 370 according to an embodiment.

Referring next to FIG. 10, description is now made on a control apparatus 370 provided, for the photographing system 310, in the control center 320. As shown in the figure, the control apparatus 370 in the embodiment is configured, by mutual connection through a bus 378, with a CPU (central processor unit) 371 to administer the operation in the entire control apparatus 370, a RAM 372 for use as a work area or the like of upon executing various processes by the CPU 371, a ROM 373 storing various parameters, programs and the like, a hard disk 374 to store various pieces of information, a transmission control section 376 having a terestrial-wave antenna 375 to send radio signals to the cameras 330, and input/output port (I/O) 377 connected to all the tag sensors 350.

Consequently, the CPU 371 is allowed to arbitrarily access the RAM 372, ROM 373 and hard disk 374 and transmit, to the cameras 330, a radio signal representative of information in various kinds through the ground-wave antenna 375 and transmission control section 376. Also, the CPU 371 can grasp a result of radio signal reception from the IC tag 340, through all the tag sensors 350.

In the meanwhile, the hard disk 374 of the embodiment is previously stored with a tag-sensor position table T1 to represent an arrangement position of every tag sensor 350 and a possessor identifying table T2 to identify a possessor of the IC tag 340.

The tag-sensor position table T1 is stored, as shown in FIG. 11A, with sensor identifying information (numerical information in the embodiment) differently assigned to each tag sensor 350 and position information representing an arrangement position of the tag sensor 350 represented by the sensor identifying information (three-dimensional position information in latitude, longitude and altitude in the embodiment), that are associated with the tag sensor 350. On the contrary, the possessor identifying table T2 is stored, as shown in FIG. 11B, with tag identifying information (numerical information in the embodiment) differently assigned to each IC tag 340 and possessor information to identify a possessor (athlete H or subject spectator K) carrying the IC tag 340 provided with the tag identifying information, that are associated with based on the IC tag 340.

On the other hand, the IC tag 340 is made to constantly send a radio signal representative of the tag identifying information assigned to itself. The tag sensor 350 outputs the tag-identifying information represented by a radio signal received from the IC tag 340 to the I/O 377 of the control apparatus 370.

Consequently, by looking up the possessor identifying table T2, the CPU 71 can identify a possessor who is carrying the IC tag 340 detected by the tag sensor 350 depending upon the tag-identifying information received from the tag sensor 350 via the I/O 377. Also, by looking up the tag sensor position table T1, the CPU 71 can recognize an arrangement position of the tag sensor 350. As a result of this, it is possible to specify a position of a possessor having the IC tag 340 detected by the tag sensor 350. It is noted that there is a possibility to receive a radio signal from the same IC tag 340 simultaneously by a plurality of tag sensors 350 depending upon a position of a possessor of the IC tag 340. In such a case, a tag sensor 350 having received the radio signal at the highst intensity is applied for processing.

The CPU 371 detects three-dimensional positions of all the athletes H and subject spectators K at a predetermined time interval (of 3 seconds in the embodiment) as in the above manner, and controls the transmission control section 376 to transmit, as a radio signal, position information representative of all the detected positions by being associated with the corresponding possessor information. Thus, the position information of all the athletes H and subject spectators K is transmitted to the cameras 330.

Figure 12:
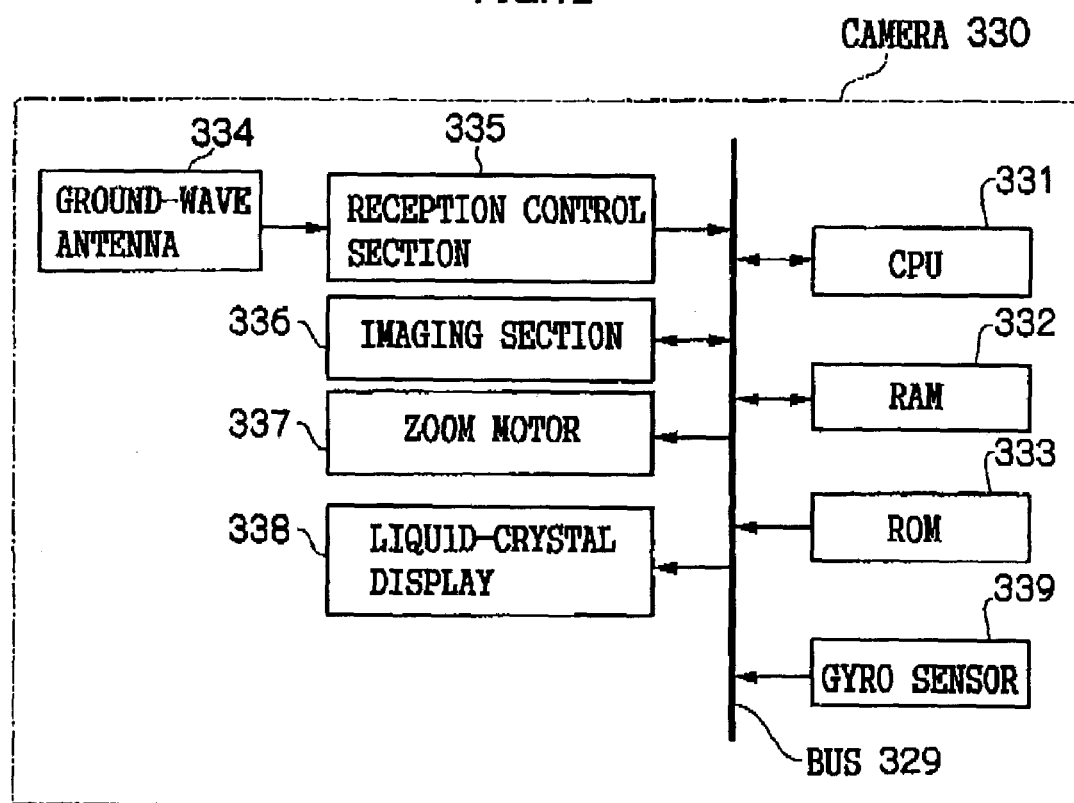
FIG. 12 is a block diagram showing a configuration of a camera 330 according to a third/fifth embodiment.

Referring next to FIG. 12, the configuration of the camera 330 is now described. As shown in the figure, the camera 330 in this embodiment is configured, by mutual connection through a bus 329, with a CPU 331 to administer the overall operation of the camera 330, a RAM 332 for use as a work area or the like upon executing various processes by the CPU 331, a ROM 333 storing various parameters, programs and the like, a reception control section 335 having a ground-wave antenna 334 to receive a radio signal sent from the control apparatus 370, an imaging section 336 to take an image of a subject, a zoom motor 337 to change the optical magnification upon imaging by the imaging section 336, a liquid-crystal display 338 to display in real-time a subject image obtained by imaging by the imaging section 336, and a gyro sensor 339 to detect a photographing direction of the camera 330 (horizontal-and-vertical two direction in the embodiment).

Accordingly, the CPU 331 is allowed to arbitrarily access the RAM 332 or ROM 333 and receive a radio signal sent from the control apparatus 370 through the ground-wave antenna 334 and reception control section 335. Also, the CPU 331, having a role to control the imaging operation of the imaging section 336, can change the optical magnification at that time by controlling the drive of the zoom motor 337. Furthermore, the CPU 331 can causes the liquid-crystal display 338 to display a subject image obtained by imaging due to the imaging section 336, a menu screen and so on. The CPU 331 can always grasp a photographing direction of the camera 30 depending on an output signal from the gyro sensor 339.

Incidentally, in the camera 330 of the embodiment, a menu screen is prepared to input target subject information representative of a target subject and spectator information representative of a spectator carrying the relevant camera 330. The spectator is allowed to previously input target subject information and spectator information on the menu screen. This embodiment applies, as target subject and spectator information, the possessor information stored in the possessor identifying table T2. Accordingly, the embodiment presents possessor information about all the athletes H and possessor information associated with the distributed tag ICs 340 (i.e. spectator information) to the subject spectators K when distributing IC tags 40 or at the entrance of the athletic arena. Thus, the subject spectator K is allowed to previously input possessor information corresponding to a target subject of among the presented information (i.e. target subject information) and spectator information to the camera 330 through the menu screen.

Figure 13:
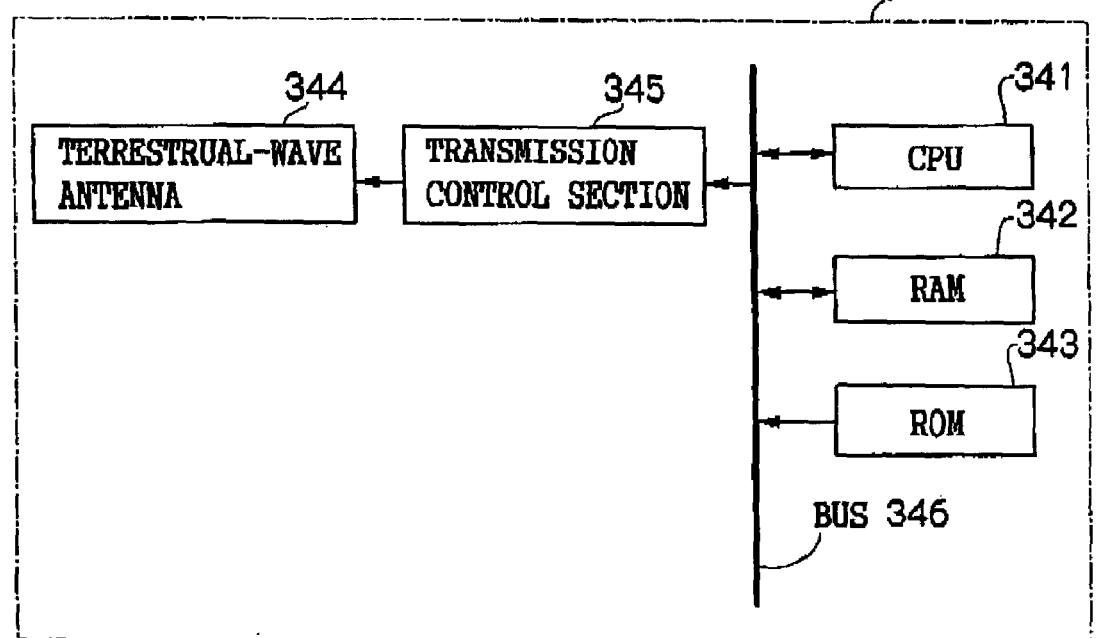
FIG. 13 is a block diagram showing a configuration of an IC tag 340 according to an embodiment.

Referring next to FIG. 13, now described is the configuration of the IC tag 340. As shown in the figure, the IC tag 340 of the embodiment is configured, by mutual connection through a bus 346, with a CPU 341 to administer the overall operation of the IC tag 340, a RAM 342 for use as a working area upon executing various processes by the CPU 341, a ROM 343 storing various parameters and programs, the foregoing tag identifying information and the like, and a transmission control section 345 having, on the tag sensor 350, a ground-wave antenna 344 to transmit a radio signal representative of tag identifying information of the relevant IC tag 340 to the tag sensor 350.

Accordingly, the CPU 341 can arbitrarily access the RAM 342 and ROM 343 and transmit a radio signal representative of tag identifying information to the tag sensor 350 through the ground-wave antenna 344 and transmission control section 345. Note that the IC tag 340 of the embodiment is made to always transmit a radio signal representative of tag identifying information.

The IC tag 340 corresponds to a position-signal transmitting apparatus of the invention, the ground-wave antenna 344 and transmission control section 345 to transmitting means of the invention, the CPU 371 to detecting means of the invention, the camera 330 to a photographing apparatus of the invention, the liquid-crystal display 338 to display means of the invention, the zoom motor 337 to adjusting means of the invention, and the CPU 331 to deriving means and control means of the invention, respectively.

The operation of the photographing system 310 of this embodiment is now described in detail. First referring to FIG. 14, described is a position-information transmitting process to be executed in the control apparatus 370. Incidentally, FIG. 14 is a flowchart showing a flow in a position-information transmitting process program to be executed at a predetermined time interval (of 3 seconds in the embodiment) by the CPU 371 of the control apparatus 370. This program is previously stored in a predetermined area of the ROM 373.

In step 400 of the figure, three-dimensional positions of all the athletes H and subject spectators K are derived from; tag identifying information received from each tag sensor 350 through I/O 377, the tag-sensor position table T1 and possessor identifying table T2. In the next step 402, the transmission control section 376 is controlled to transmit, as a radio signal, position information representative of all the derived positions by being associated with the corresponding possessor information. This transmits position information about all the athletes H and subject spectators K to the cameras 330. Thereafter, the position information transmitting process is ended.

Referring next to FIG. 15, described is a photographing assist process to be executed on the camera 330. Incidentally, FIG. 15 is a flowchart showing a flow of process of a photographing assist process program to be executed by the CPU 331 of the camera 330 upon receiving a radio signal from the control apparatus 370. The program is previously stored in a predetermined area of the ROM 333. Description is herein made on a case that the information related to all the athletes H (text information in the embodiment, hereinafter referred to as "related information") is previously stored in the ROM 333 of the camera 330.

In step 500 of the picture, a direction of a target subject (in the present embodiment, the direction of the target subject is a direction in two-dimensions horizontal and vertical, and is called a "subject direction" hereinafter) when a position of the customer possessing the camera 330 is made the viewpoint is derived based on the position information and the possessor information indicated by the radio signal sent from the control device 370. In the next step 502, determination is made as to whether or not the target subject positioned in a subject direction derived in the step 500 is placed within a photographing image frame showing a predetermined photographing scope, in a current photographing direction acquired by the gyro sensor 339. In the case of an affirmative determination, the process moves to step 504 to read related information to the relevant target subject out of the ROM 333. The liquid-crystal display 338 is controlled to display that information, and then the process moves to step 510.

Figure 16A:
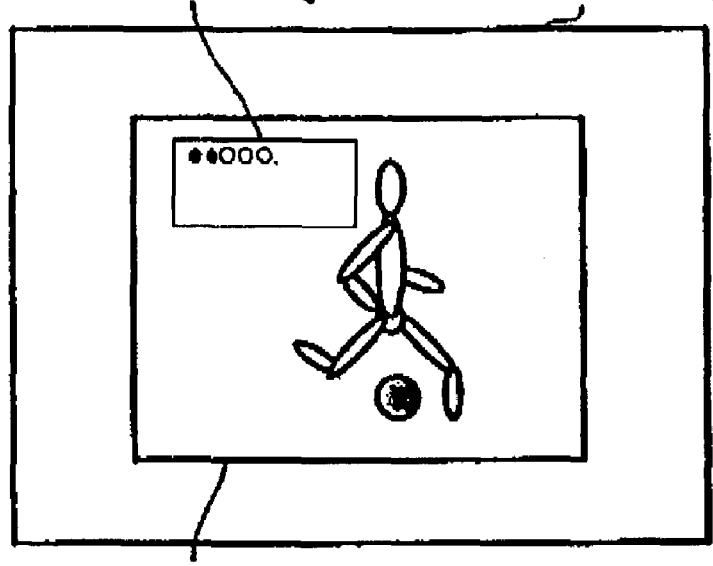
FIGS. 16A and 16B are schematic views showing an example of an image to be displayed on a liquid-crystal display 338 of a camera 330 (camera 330') in the course of executing the photographing assist process program according to the embodiment.

FIG. 16A shows one example of a display screen being displayed on the liquid-crystal display 338 by the process of the step 504. In the shown example, related information I is displayed on the liquid crystal display 338, being synthesized with the image obtained by the photographing (what is called a through image). Accordingly, the photographing person (spectator) is allowed to take a picture of the target subject while making reference to the related information 1.

On the other hand, in the case of a negative determination in the step 502, i.e. when the target subject, in the current photographing direction, is not within the photographing image frame showing a photographing scope, the process moves to step 506, to derive a moving direction from photographing direction for placing the target subject within the photographing image frame. The moving direction is horizontal-and-vertical two-dimensional direction in the embodiment. In the next step 508, a direction indicating arrow (corresponding to "direction information" in the invention) showing a derived moving direction is displayed on the liquid crystal display 338, and then the process moves to step 510.

Figure 16B:
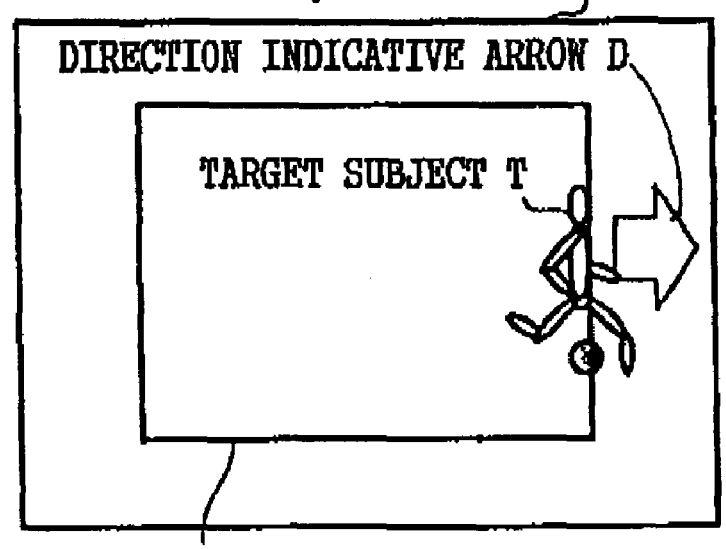

FIG. 16B shows one example of a display screen being displayed on the liquid-crystal display 338 by the process of the step 508. In the shown example, a through image is displayed within the photographing image frame W, wherein a direction indicating arrow D indicating a moving direction is displayed at an end position of the moving direction (rightward in the figure) in the outside of the photographing image frame W. Accordingly, the photographing person (spectator) is allowed to position the target subject to the inside of the photographing image frame W by moving the photographing direction of the camera 330 toward the direction indicated by the direction indicating arrow D while confirming a presence or absence of the target subject. As a result of this, the target subject can be easily, positively taken a picture.

In step 510, calculated is a distance from a position of the spectator carrying the camera 330 to a position of the target subject depending upon the position and possessor information represented by the radio signal received from the control apparatus 370. In the next step 512, on the basis of the derived distance, derived is an optical magnification at which the athlete as the target subject is placed within the photographing image frame W of the camera 330, in a balanced size within the photographing image frame W (in a size nearly a quarter of the area of the photographing image frame W, in the embodiment).

In the next step 514, the zoom motor 37 is controlled to the optical magnification derived in the step 512. Thereafter, the photographing assist process program is ended.

By repeatedly executing the photographing assist process each time a radio signal is received from the control apparatus 30, the photographing person (spectator), even when losing sight of a target subject, can put the target subject to the inside of the photographing image frame W by merely moving the photographing direction of the camera 330 toward the direction indicated by the direction indicating arrow D. Thus, it is possible to positively take a picture of the target subject.

As explained in detail in the above, in the photographing system 310 and method in the embodiment, the IC tag 340 transmits a radio signal representing a position of a target subject as a target of photographing. The camera 330 derives both a photographing direction and a magnification to place a target subject within a photographing scope according to the position of the target subject detected based on the radio signal and a self-position. Direction information representative of that photographing direction is displayed on the liquid-crystal display 338, and the magnification in photographing is adjusted to that magnification. Accordingly, it is easy for the photographing person to easily catch the target subject. As a result of this, even when taking a picture of a moving subject, the subject can be easily, positively taken a picture.

Also, in the photographing system 310 and method of the embodiment, because the detecting means (CPU 371 of the control apparatus 370) for detecting a position of a camera 330 is provided externally of the camera 30, the process load on the camera 330 can be reduced as compared to the case the detecting means is provided on the camera 330.

Furthermore, in the photographing system 310 and method of the embodiment, the liquid-crystal display 338 is controlled to display related information to the target subject when the target subject is being displayed on the liquid-crystal display 338. Accordingly, the photographing person is allowed to take a picture of the target subject while making reference to information related to the target subject. Thus, convenience can be improved for the photographing person.

Incidentally, the embodiment described on the case that IC tags 340 are previously distributed to the spectators carrying the cameras 330 in order to specify a position of the camera 330 so that a position specified by the IC tag 340 can be applied as a position of the camera 330, the invention is not limited to that. For example, a function capable of detecting a self-position (GPS function as one example) can be previously mounted on the camera 330, to provide a form that a position of the camera 330 can be specified by utilizing that function. In this case, it is possible to reduce the cost required in distributing IC tags 340 to the spectators and the cost for arranging tag sensors 350 on the spectator seats.

Fourth Embodiment

The fourth embodiment describes a form on a case that the detecting means of the invention is provided on the photographing apparatus while the deriving means of the invention is provided on an apparatus other than the photographing apparatus (herein, control apparatus 370).

Figure 17:
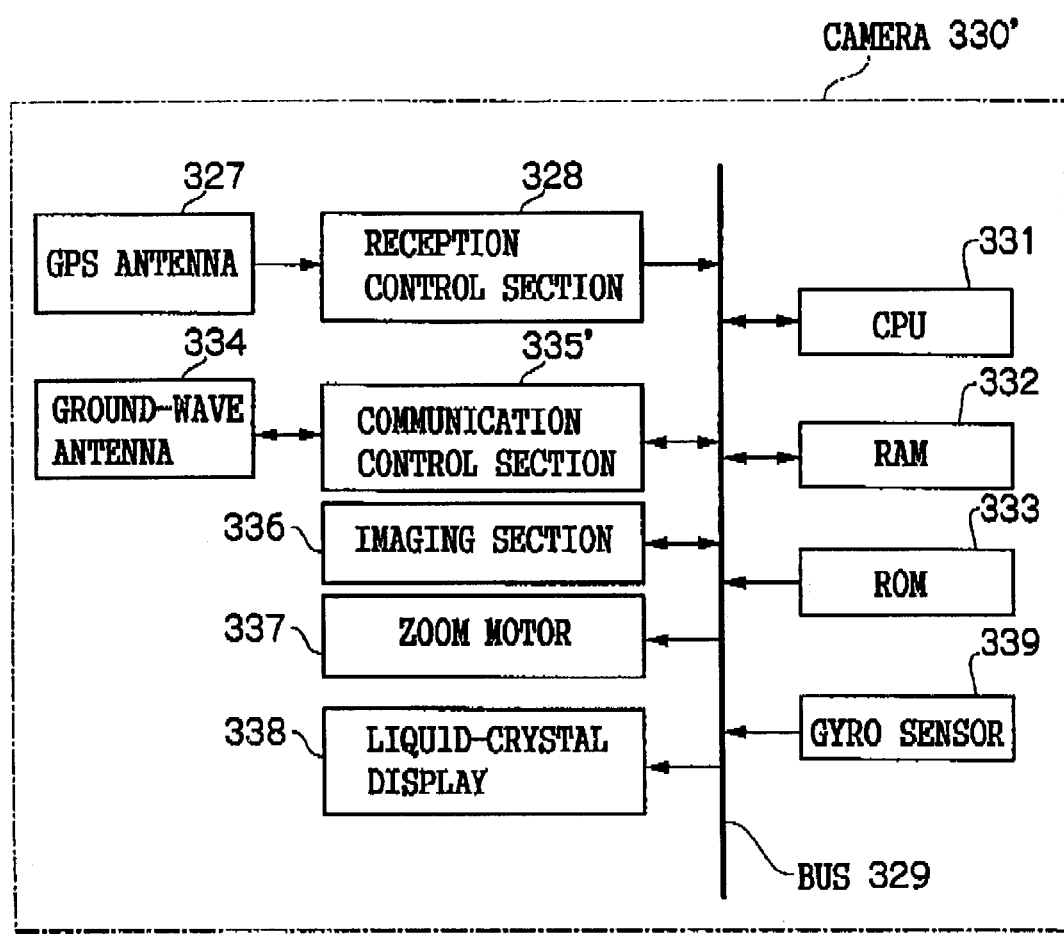
FIG. 17 is a block diagram showing a configuration of a camera 330' according to a second embodiment.

FIG. 17 shows a configuration of a camera 330' according to the present embodiment. Note that the same constituent elements in the figure as those of FIG. 12 are attached with the same references, to omit the explanations thereof.

As shown in the figure, the camera 330' of the fourth embodiment is different from the camera 330 of the first embodiment only in that it has a reception control section 328 having a GPS antenna 327 to receive a GPS signal from a GPS satellite and uses, in place of the reception control section 335, a communication control section 335' to control transmission/reception of various pieces of information via a ground-wave antenna 334.

The CPU 331 controls the reception control section 328 to receive GPS signals of from three or more GPS satellites in plurality through a GPS antenna 327, and derives position information representative of a self-position (three-dimensional information about latitude, longitude and altitude, in this embodiment) by a well-known calculation according to the GPS signals received by the above. Also, the CPU 331 can mutually communicate with the control apparatus 370 through the ground-wave antenna 334 and communication control section 335'.

On the other hand, the configuration of the control apparatus 370 of the fourth embodiment, although not shown, is different from that of the control apparatus 370 of the third embodiment only in using a communication control section to control transmission/reception of various pieces of information through a ground-wave antenna 375 in place of the transmission control section 376 of the control apparatus 370 (see FIG. 10) of the third embodiment. The CPU 371 of the control apparatus 370 of the fourth embodiment accordingly can mutually communicate with the camera 330' through the ground-wave antenna 375 and communication control section 335'. Furthermore, in the photographing system 310 according to the fourth embodiment, no tag sensors 350 are arranged on the spectator seats.

Incidentally, the other configurations than those of the photographing system are similar to those of the photographing system 310 of the third embodiment, and hence here, explanation is omitted. In this case, the CPU 331 of the camera 330' corresponds to the detecting means of the invention while the CPU 371 of the control apparatus 370 to the deriving means of the invention.

Figure 18:
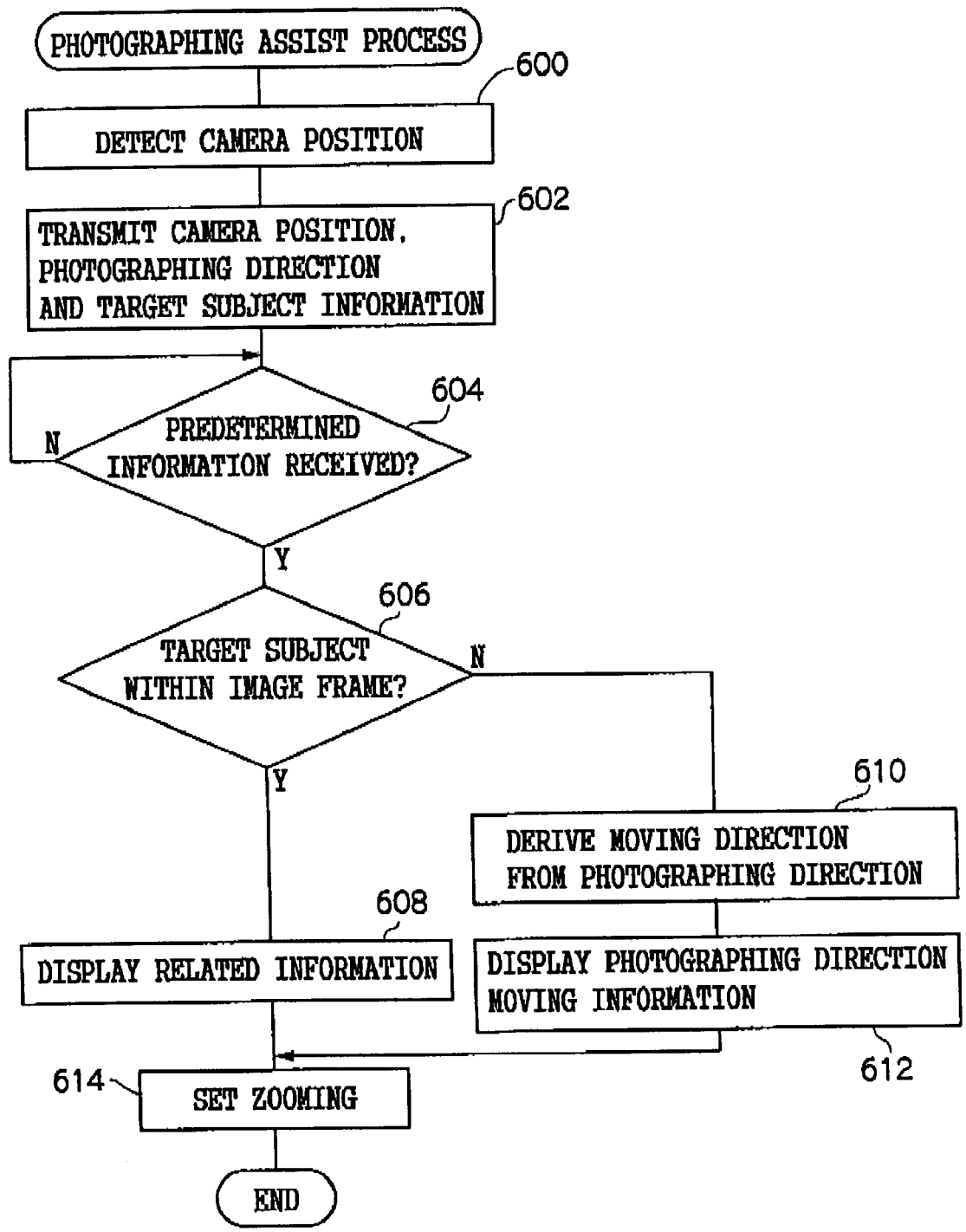
FIG. 18 is a flowchart showing a flow of process of a photographing assist process program according to the fourth embodiment.

The operation of the photographing system 310 of this embodiment is now described in detail. Referring first to FIG. 18, explained is a photographing assist process to be executed in the camera 330'. Incidentally, FIG. 18 is a flowchart showing a flow of process in a photographing assist processing program to be executed at a predetermined time interval (of 3 seconds in the embodiment) by the CPU 331 of the camera 330'. This program is previously stored in a predetermined area of the ROM 333.

In step 600 of the figure, position information representative of a self-position is derived depending upon a plurality of GPS signals acquired from the reception control section 328 as stated before. In the next step 602, the communication control section 335' is controlled to send, as a radio signal, the position information derived in the step 600, the photographing direction information representative of a current photographing direction acquired from the gyro sensor 339 and the target subject information previously inputted by the spectator, together with the possessor information representative of a possessor of the relevant camera 330'. Due to this, these pieces of information are sent to the control apparatus 370. In response to this, the control apparatus 370 derives the subject direction and optical magnification on the basis of the position information, photographing direction information and target subject information represented by the received radio signal. The control apparatus 370 controls the communication control section to send, as a radio signal, the subject direction information representative of a subject direction and the optical magnification information representative of an optical magnification, together with the received possessor information.

In the next step 604, waited is for receiving a radio signal representative of these pieces of information from the communication control section of the control apparatus 370. In the next step 606, determination is made as to whether or not the target object positioned in a subject direction represented by the received radio signal in the step 604 is within the photographing image frame showing a predetermined photographing scope, in the current photographing direction acquired from the gyro sensor 339. In the case of an affirmative determination, the process moves to step 608 to read, from ROM 333, related information to the target subject and control the liquid-crystal display 338 to display the information. Thereafter, the process moves to step 614.

By the process of step 608, an image shown as an example in FIG. 8A is displayed on the liquid-crystal display 338. Accordingly, the photographing person (spectator) is allowed to take a picture of the target subject while making reference to the related information I to the target subject.

On the other hand, in the case of a negative determination in the step 606, i.e. when the target subject in the current photographing direction is not within the photographing image frame showing a photographing scope, the process moves to step 610. In this step, a moving direction from photographing direction for placing the target subject within the photographing image frame (horizontal-and-vertical two-dimensional direction in this embodiment) is derived depending on the subject direction represented by the radio signal received in the step 604 and the current photographing direction represented by the gyro sensor 339. In the next step 612, displayed is a direction indicating arrow showing a derived moving direction (corresponding to "direction information" of the invention) on the liquid-crystal display 338. Thereafter, the process moves to step 614.

By the process of step 612, an image shown as an example in FIG. 16B is displayed on the liquid-crystal display 338. Accordingly, the photographing person (spectator) is allowed to place the target subject to the inside of the photographing image frame W by moving the photographing direction of the camera 330' toward the direction by the direction indicating arrow D while confirming a presence or absence of the target subject: As a result of this, the target object can be easily, positively taken a picture.

In step 614, the zoom motor 337 is controlled to the optical magnification represented by the received radio signal in step 604. Thereafter, the photographing assist process program is ended.

By repeatedly executing the photographing assist process program each time a radio signal is received from the control apparatus 370, the photographing person (spectator), even when losing sight of a target subject, can put the target subject to the inside of the photographing image frame W by merely moving the photographing direction of the camera 30' toward the direction indicated by the direction indicating arrow D. Thus, it is possible to positively take a picture of the target subject.

Figure 19:
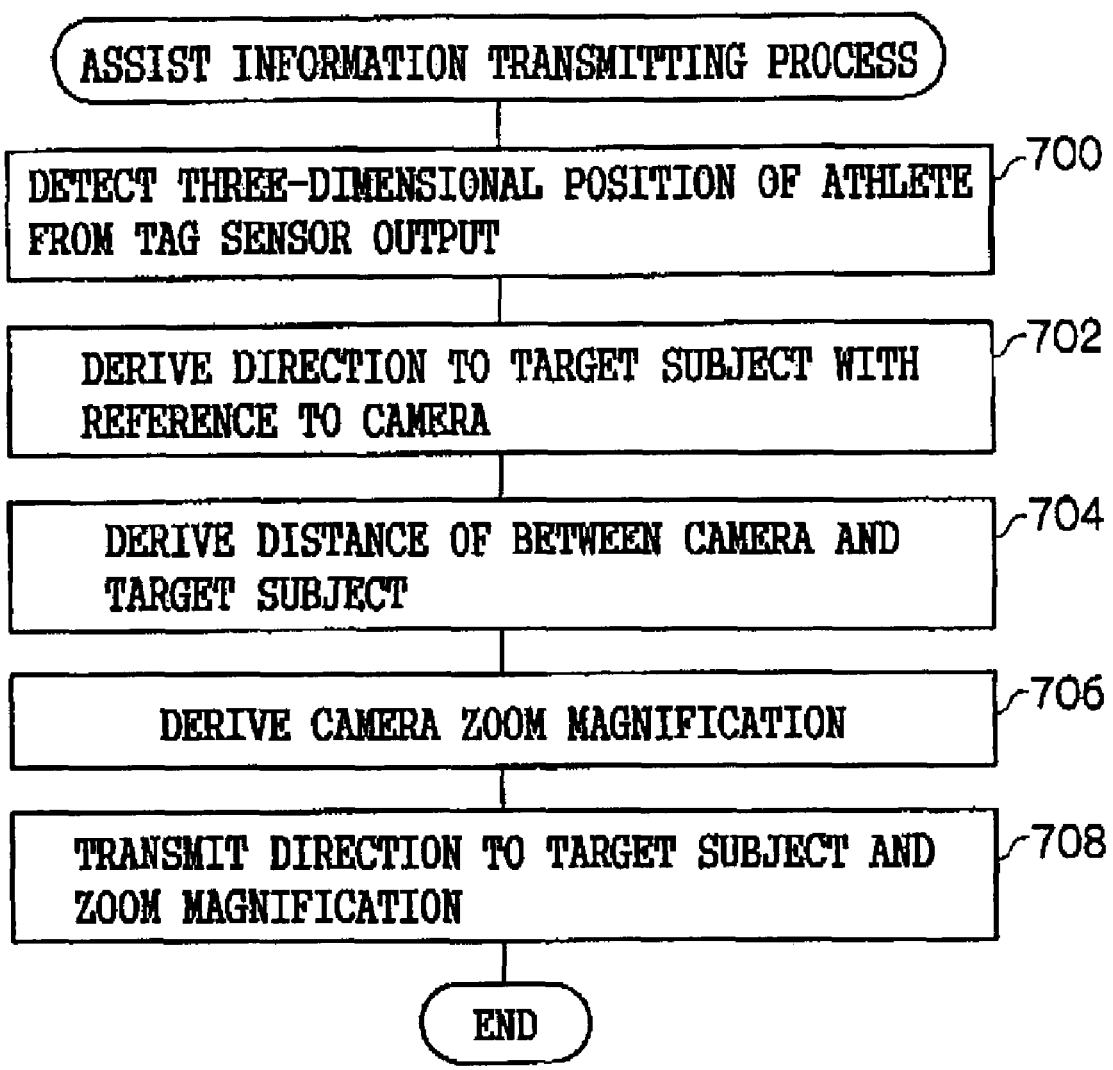
FIG. 19 is a flowchart showing a flow of process of an assist information transmitting process program according to the fourth embodiment.

Referring next to FIG. 19, description is made on an assist-information transmitting process to be executed in the control apparatus 370 according to the fourth embodiment. Incidentally, FIG. 19 is a flowchart showing a flow of process in an assist-information transmitting process program to be executed by the CPU 371 of the control apparatus 370 when receiving a radio signal from the camera 330'. This program is previously stored in a predetermined area of the ROM 373.

In step 700 of the figure, a three-dimensional position of an athlete H taken as the target subject is derived depending on the tag identifying information received from each tag sensor 350 through I/O 377, the tag sensor position table T1 and possessor identifying table T2 and the target subject information received from the camera 330'. In the next step 702, the subject direction information representative of a direction of the target subject as taking a position of the camera 330' as a visual point is derived depending on the position information represented by the received radio signal from the camera 330' and the three-dimensional position of athlete H derived in the step 700. In the next step 704, a distance of from a position of the camera 330' to a position of the target subject is derived depending on the position information represented by the received radio signal from the camera 330' and the three-dimensional position of athlete H derived in the step 700. In the next step 706, depending on the derived distance, an optical magnification is derived at which the athlete as a target subject can be within the photographing image frame W of the camera 330', in a balanced size in the photographing image frame W (nearly a quarter of the area of the photographing image frame W, in the embodiment).

In the next step 708, the communication control section is controlled to send, to the camera 330', the subject direction information derived in the step 702 and the optical magnification information representative of an optical magnification derived in the step 706, together with the possessor information represented by the received radio signal from the camera 330'. Due to this, the subject direction information and the optical magnification information are sent to the camera 330'. Thereafter, the assist information transmitting process program is ended.

As described in detail in the above, the photographing system 310 and method of the embodiment can enjoy the similar effect to that of the foregoing photographing system 310 and method of the third embodiment. Moreover, because a photographing direction and magnification in the invention is derived in the controlling apparatus 370, the process load on the camera can be reduced as compared to the case of deriving it by the camera.

Incidentally, although this embodiment described on the case that each athlete H is made to carry the IC tag 340 in order to specify a position of the athlete H, the invention is not limited to that. For example, it is possible to provide a form that each athlete H is made to carry an apparatus having a function to detect his/her own position (GPS function as an example) so that a position of each athlete H can be specified by utilizing that function. In this case, it is possible to curtail the cost required in arranging tag sensors 350 over the ground.

Fifth Embodiment

The fifth embodiment describes on a form to change a display state of related information, displayed together with a through image on a liquid crystal display of the camera, according to a moving speed of a target subject, i.e. an embodiment as set forth in claim 24. Incidentally, the configuration of a photographing system 310 of the fifth embodiment is similar to that of the third embodiment, and hence here, explanation is omitted. Also, the position information transmitting process to be executed by the control apparatus 370 in the fifth embodiment is similar to the position information transmitting process to be executed by the control apparatus 370 in the third embodiment (see FIG. 14), and hence omittedly explained herein.

Figure 20:
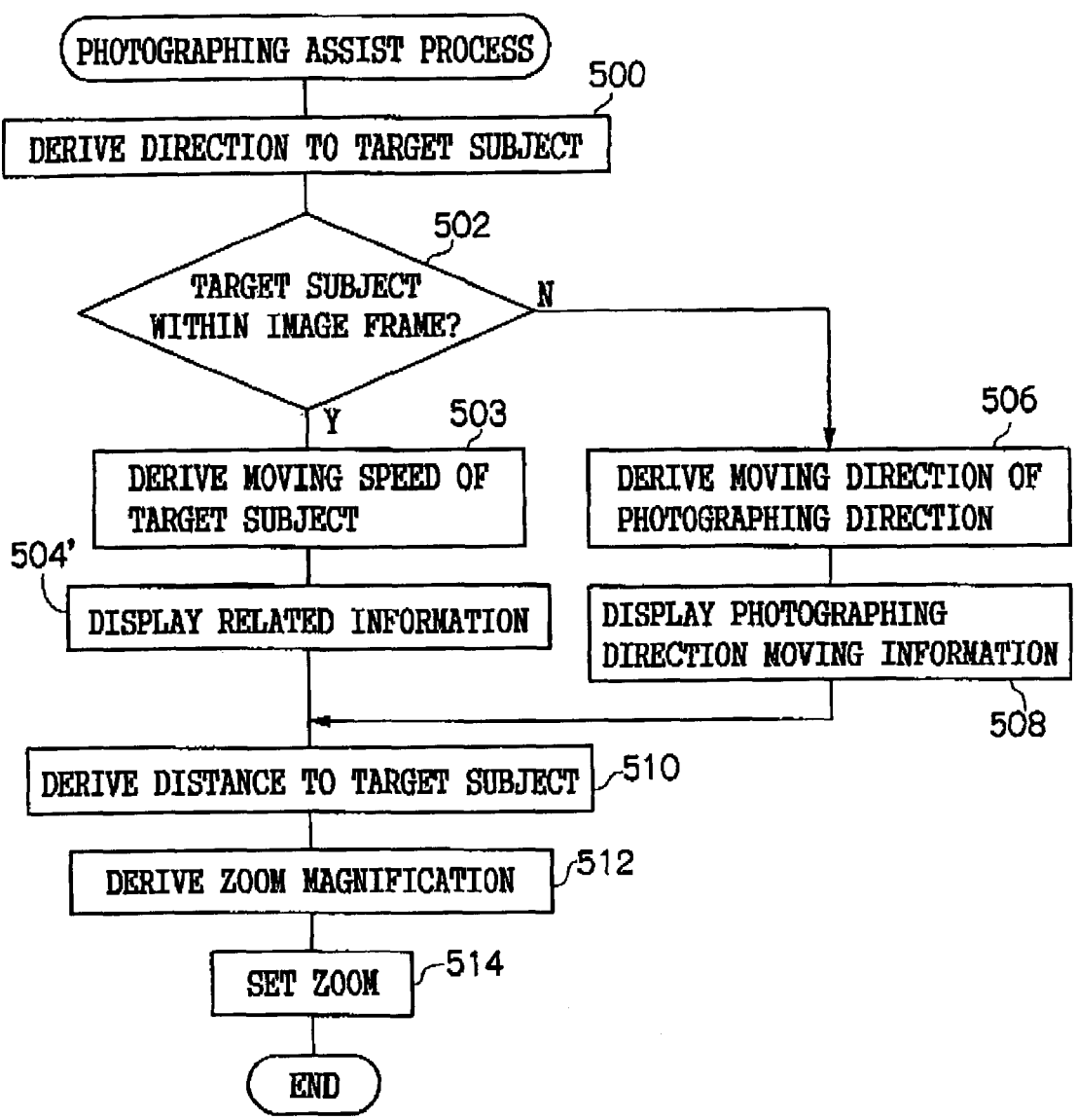
FIG. 20 is a flowchart showing a flow of process of a photographing assist process program according to the fifth embodiment.

Referring to FIG. 20, described in the below a photographing assist process to be executed in the camera 330 according to the fifth embodiment. Incidentally, FIG. 20 is a flowchart showing a flow of process of a photographing assist process program to be executed by the CPU 331 of the camera 330 of the fifth embodiment when receiving a radio signal from the control apparatus 370. The step of the same process as that of FIG. 15 is attached with the same step number as that of FIG. 15, and omittedly explained.

In the step 503 of the figure, a moving speed of a target subject is derived depending on a position of the target subject represented by a radio signal received from the control apparatus 370 during the preceding execution of the photographing assist process, a position of the target subject represented by a radio signal received in this time from the control apparatus 370, and a lapse time from the preceding execution of the photographing assist process. In the next step 504', related information to the target subject is read out of the ROM 333. The liquid-crystal display 338 is controlled to display that information in a display state in accordance with the moving speed derived in the step 503. Thereafter, the process moves to step 510.

Examples of the display state corresponding to the moving speed include the following three statuses:

decreasing the number of display items as moving speed increases;

increasing the size of display character as moving speed increases; and decreasing the number of display characters as moving speed increases.

As described in detail above, the photographing system 310 and method of this embodiment can enjoy the similar effect to that of the photographing system 310 and method of the third embodiment. Moreover, a moving speed of a target subject is derived depending on a change amount per predetermined time in position of the target subject to control the liquid-crystal display 38 such that related information is changed in display state in accordance with the moving speed. Accordingly, even where a target subject is at a high speed and there is less opportunity to sufficiently make reference to related information, it can be made easy to make reference to the related information, further improving convenience for the photographing person.

Incidentally, although the above embodiments described on the case that the direction indicating arrow D (see FIG.

Figure 21:
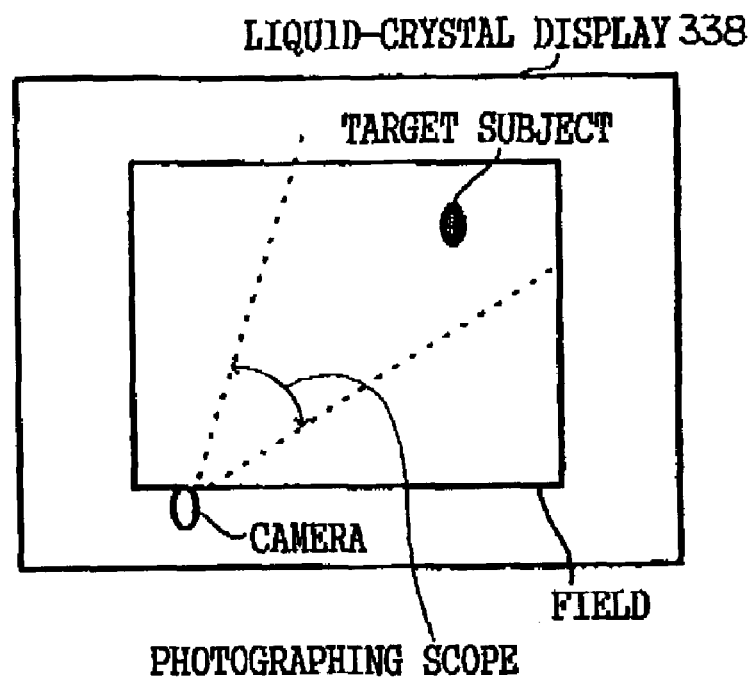
FIG. 21 is a schematic view for explaining another embodiment.

16B) was applied as direction information of the invention, the invention is not limited to that. For example, it is possible to provide a form, as shown in FIG. 21, that a plan view showing a camera position, photographing direction, field, target subject position and photographing scope of the camera is displayed as direction information of the invention on the liquid-crystal display 338.

In this case, a positional relationship between the target subject and the camera for the whole field becomes clear, and it is possible to understand an amount of movement of the photographing direction to place the target subject in the photographing region.

Figure 22:
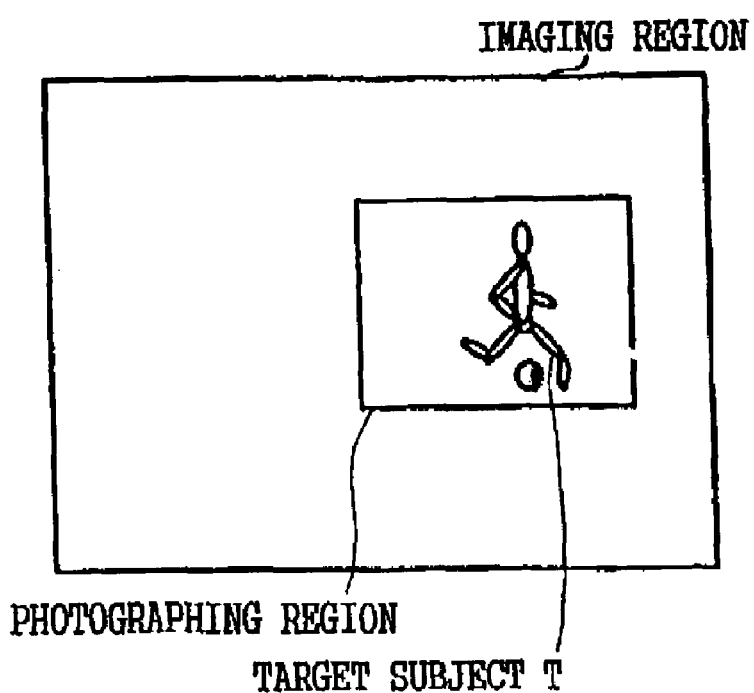
FIG. 22 is a typical view showing an example of a relationship between an imaging region and an actual photographing region according to the photographing apparatus.

Meanwhile, the embodiments did not mention a relationship between the imaging region by the imaging device provided in the imaging section 336 of the camera and the actual photographing region. However, it is preferred to provide a form that a photographing region is given by a narrower range than an imaging-device imaging region as shown in FIG. 22 so that image information corresponding to the photographing region can be extracted, for application, by trimming out of the image information over the entire imaging region. This can suppress the occurrence of a move from camera photographing direction to capture a target subject T, and hence improve operationality.

Meanwhile, the embodiments did not mention a move amount from camera photographing direction. However, it is possible to provide a form that the size of the direction indicating arrow D (see FIG. 16B) increases with increase in the move amount. Due to this, the photographing person can grasp a move amount from photographing direction, and place a target subject to the inside of the photographing scope more properly in a brief time.

Meanwhile, although the third and fifth embodiments described the case in which the IC tags 40 were possessed by athletes H and spectators K and tag sensors 350 are arranged over the playing field and on spectator seats to detect a position of an athlete H or spectator K, the invention is not limited to that. For example, it is possible to provide a form that a position of an athlete H or spectator K is to be detected by making athletes H and spectators K carry tag sensors 350 and arranging IC tags 340 over the ground and on spectator seats. In this case, there is a need to provide a transmission function on the tag sensor 350 to transmit a radio signal representative of tag identifying information represented by a radio signal received from the IC tag 340. In also this case, the effect similar to that of the third and fifth embodiments can be enjoyed.

Meanwhile, each process flow of the process program explained in the embodiment (see FIGS. 14, 15, 18-20) is a mere example. It is needless to say that it can be appropriately changed within a scope not departing from the gist of the invention.

Incidentally, although the invention is to assist a photographing operation by a camera (camera work), it is needless to say that a similar art can be applied as an art to assist for capturing a target subject on a binocular or telescope.

What is claimed is:

1. An image identifying apparatus comprising:
    an acquiring component which acquires a photographing date/time and photographing location at the time of taking a picture with an unspecified person as a subject;
    an image data storage device which stores image data acquired by the photographing; and
    an identifying device which identifies, by collating a movement history of a person photographed as a subject with the photographing date/time and the photographing location, which correspond to said stored image data, at least one of
    (a) a person who is the subject of the image expressed by the image data, and
    (b) image data of an image for which a particular person is the subject,
    wherein prior to collating in the identifying device, the movement history and the photographing date/time are independent of each other and wherein the movement history of a person photographed as a subject is acquired independently of said stored image data.

2. The image identifying apparatus according to claim 1, wherein the image data storage device corresponds the image data with the photographing data/time and photographing location acquired by the photographing, and stores corresponded information.

3. The image identifying apparatus according to claim 1, wherein a photographing apparatus used for the photographing comprises a date/time detecting component which detects the current date/time and a position detecting component which detects the current position, and
    the acquiring component acquires said detected current date/time of the photographing time, which date/time were detected by the date/time detecting component, and a position at the time of photographing, which position was detected by the position detecting component.

4. The image identifying apparatus according to claim 1, wherein a plurality of image data is stored in the image data storage device, and the identifying device collates the movement history of the particular person inputted through an input device with each of the plurality of photographing date/times and locations corresponding to any of the plurality of image data stored in the data storage device, to identify the image data of the image having the particular person as the subject.

5. An image identifying apparatus according to claim 4, wherein the movement history of a person is automatically recorded to a storage medium, the input device reading the movement history of the particular person from the storage medium.

6. The image identifying apparatus according to claim 1, wherein the image identifying apparatus is configured to be externally given a predetermined instruction to use a result of identification by the identifying device, the identifying device carrying out the identification prior to being given the instruction.

7. The image identifying apparatus according to claim 1, further comprising a gathering component which gathers movement histories of a plurality of persons, and a movement history storage device which stores the movement histories of the plurality of persons gathered by the gathering component, wherein the identifying device collates a photographing date/time and photographing location corresponding to the image data with each of the movement histories of the plurality of persons stored in the movement history storage device, to identify the person who is the subject in the image represented by the image data.

8. The image identifying apparatus according to claim 7, wherein the gathering component gathers each of the movement histories of the plurality of persons by: periodically receiving the current position of the individual person; corresponding said received current position of the individual person with the current date/time and information for identifying said individual person; and making the movement history storage device store said corresponded information.

9. The image identifying apparatus according to claim 8, wherein the current positions of the individual person to be detected by communication between a portable communication apparatus carried by the individual person and base stations provided at a substantially constant distance.

10. The image identifying apparatus according to claim 8, wherein the current position of an individual person is detected by a position detecting device provided in a portable communication apparatus carried by the individual person.

11. The image identifying apparatus according to claim 1, wherein the acquiring component acquires at least one of a photographing azimuth and photographing magnification at the time of taking a picture with the unspecified person as a subject, and the identifying device uses at least one of the photographing azimuth and photographing magnification acquired by the acquiring component to identify the person as the subject in the image represented by the image data stored in the image data storage device or identify image data of the image having the particular person as the subject.

12. An order processing apparatus comprising:
the image identifying apparatus according to claim 1;
a display control component which causes a display device to display an image having the specified person as the subject depending upon a result of the identification by the identifying device; and
a processing component which carries out a predetermined process according to an order from a customer for the image displayed on the display device.

13. The order processing apparatus according to claim 12, wherein the image data storage device of the image identifying apparatus corresponds the image data with the photographing date/time and photographing location acquired by the photographing, and stores corresponded information.

14. The order processing apparatus according to claim 12, wherein the processing component carries out, as the predetermined process, a print producing process or a print production requesting process, which use, from among the image data stored in the image data storage device, image data of the image designated by the customer; and a print delivering or print transmitting process for delivering or transmitting to the customer the image data of the designated image.

15. The apparatus of claim 1, wherein the movement history comprises a date/time and location of the person photographed.

16. The apparatus of claim 1, wherein the acquiring component acquires at least one of magnification and speed at the time of taking a picture with the unspecified person as a subject.

17. The apparatus of claim 1, wherein the identifying device uses at least one of the magnification and speed to identify the person as the subject.

18. The apparatus of claim 7, wherein the movement histories comprise a date/time and location of each of the plurality of persons.

19. The apparatus of claim 7, wherein the movement history of a person and the photographing date/time and location is acquired using a Global Positioning System (GPS).

* * * * *